United States Patent
Song et al.

(10) Patent No.: US 11,929,534 B2
(45) Date of Patent: Mar. 12, 2024

(54) METHOD AND SYSTEM FOR REDOX FLOW BATTERY PERFORMANCE RECOVERY

(71) Applicant: ESS TECH, INC., Wilsonville, OR (US)

(72) Inventors: Yang Song, West Linn, OR (US); Craig E. Evans, West Linn, OR (US); Brady Thompson, Canby, OR (US)

(73) Assignee: ESS TECH, INC., Wilsonville, OR (US)

( * ) Notice: Subject to any disclaimer, the term of this patent is extended or adjusted under 35 U.S.C. 154(b) by 803 days.

(21) Appl. No.: 17/070,852

(22) Filed: Oct. 14, 2020

(65) Prior Publication Data

US 2021/0135269 A1    May 6, 2021

Related U.S. Application Data

(60) Provisional application No. 62/931,117, filed on Nov. 5, 2019.

(51) Int. Cl.
    *H01M 8/18*  (2006.01)
(52) U.S. Cl.
    CPC ............... *H01M 8/188* (2013.01)
(58) Field of Classification Search
    CPC ...... H01M 8/188; H01M 8/184; H01M 8/186; H01M 8/18; H01M 8/04858; H01M 8/04949; H01M 8/04925
    See application file for complete search history.

(56) References Cited

U.S. PATENT DOCUMENTS

| | | | |
|---|---|---|---|
| 8,877,365 B2 | 11/2014 | Keshavarz et al. | |
| 9,960,443 B2 * | 5/2018 | Wang | H01M 50/414 |
| 10,424,797 B2 * | 9/2019 | Zhang | H01M 8/04611 |
| 10,581,104 B2 * | 3/2020 | Melough | H01M 8/188 |
| 2017/0012307 A1 * | 1/2017 | Kumamoto | H01M 8/188 |

FOREIGN PATENT DOCUMENTS

| | | |
|---|---|---|
| CN | 102089918 B | 5/2015 |
| CN | 105742682 A | 7/2016 |
| CN | 106415907 A | 2/2017 |
| CN | 107077893 A | 8/2017 |
| JP | 2000200615 A | 7/2000 |
| WO | 2018123962 A1 | 7/2018 |

OTHER PUBLICATIONS

ISA Korean Intellectual Property Office, International Search Report and Written Opinion Issued in Application No. PCT/US2020/055629, dated Feb. 1, 2021, WIPO, 8 pages.

* cited by examiner

*Primary Examiner* — Raymond Alejandro
(74) *Attorney, Agent, or Firm* — McCoy Russell LLP

(57) ABSTRACT

A method for a redox flow battery may include, interrupting cycling of the redox flow battery, including charging the redox flow battery to a threshold charge condition, draining positive and negative electrolyte from the redox flow battery, circulating a wash solution through the redox flow battery, and returning the positive and negative electrolyte to the redox flow battery, and resuming cycling of the redox flow battery. In this way, contamination of the redox flow battery system can be reduced, thereby prolonging the life and increasing performance of the redox flow battery system.

20 Claims, 9 Drawing Sheets

METHOD AND SYSTEM FOR REDOX FLOW BATTERY PERFORMANCE RECOVERY

CROSS REFERENCE TO RELATED APPLICATIONS

The present application claims priority to U.S. Provisional Application No. 62/931,117, entitled "Method and System for Redox Flow Battery Performance Recovery" and filed on Nov. 5, 2019. The entire contents of the above-identified application are hereby incorporated by reference for all purposes.

FIELD

The current disclosure is directed towards hybrid flow battery systems and methods of assembling hybrid flow battery systems.

BACKGROUND/SUMMARY

A reduction-oxidation (redox) flow battery is an electrochemical storage device which stores energy in a chemical form. The stored chemical energy is converted to an electrical form via spontaneous reverse redox reactions. To restore the dispensed chemical energy, an electrical current is applied to induce the reverse redox reaction. Hybrid flow batteries deposit one or more of the electro-active materials as a solid layer on an electrode. Hybrid flow batteries include a chemical that forms a solid precipitate plate on a substrate at a point throughout the charge reaction which may also be dissolved throughout the discharge reaction. During the charge reaction, the chemical may solidify on the surface of the substrate forming a plate near the electrode surface. The chemical is regularly a metallic compound. In hybrid flow battery systems, the energy stored by the redox battery may be limited by the amount of metal plated during charge and may accordingly be determined by the efficiency of the plating system as well as the available volume and surface area to plate.

The positive and negative electrodes in redox flow batteries take part in the electrochemical reactions for storing and releasing chemical energy. Thus, the electrodes may be considered an important component in batteries, as the electrode affects battery performance, capacity, efficiency and the overall cost.

One example of a hybrid redox flow battery is an all-iron redox flow battery (IFB). The IFB uses iron as an electrolyte for reactions including a negative electrode where plating occurs, herein also referred to as the plating electrode, and a positive electrode where a redox reaction occurs, herein also referred to as the redox electrode. The performance of an IFB battery can be broken down to its plating electrode performance (negative electrode), redox electrode performance (positive electrode), and ohmic resistance loss. On the plating electrode, the ferrous ($Fe^{2+}$) ion gains electrons and plates as solid iron on the substrates during charge, as shown in equation (1) below, and the solid iron dissolves as ferrous ions and releases two electrons during discharge. The equilibrium potential for the iron plating reaction is −0.44V. On the redox electrode, the redox reaction between ferrous and ferric ($Fe^{3+}$) ions occurs during charge and discharge. On the positive electrode, two $Fe^{2+}$ ions lose two electrons to form $Fe^{3+}$ ions during charge, as shown in equation (2) below and two $Fe^{3+}$ ions gain two electrons to form $Fe^{2+}$ during discharge. The equilibrium potential between ferrous and ferric ions is +0.77V. Thus, the reaction in an IFB redox flow battery is reversible.

$$Fe^{2+}+2e- \leftrightarrow Fe^{0} \text{ (Negative Electrode)} \quad (1)$$

$$2Fe^{2+} \leftrightarrow 2Fe^{3+}+2e- \text{ (Positive Electrode)} \quad (2)$$

On the negative electrode of an IFB, the ferrous iron reduction reaction competes with two side reactions: the reduction of hydrogen protons $H^+$ (reaction (3)), wherein two hydrogen protons each accept a single electron to form hydrogen gas, $H_2$, and the corrosion of deposited iron metal to produce ferrous ion $Fe^{2+}$ (reaction (4)), respectively:

$$H^+ + e^- \leftrightarrow \tfrac{1}{2}H_2 \text{ (Hydrogen proton reduction)} \quad (3)$$

$$Fe^{0}+2H^+ \leftrightarrow Fe^{2+}+H_2 \text{ (Iron corrosion)} \quad (4)$$

These two side reactions may reduce the overall battery efficiency, because electrons transferred to the negative electrode may be consumed by hydrogen production rather than by iron plating. Furthermore, these side reactions may result in imbalanced electrolytes, which may in turn, result in battery capacity loss over time. The $Fe^{2+}/Fe^{3+}$ redox reaction at the positive electrode is fast kinetically. The IFB battery performance may therefore be limited by its negative electrode performance, which is a result of the plating kinetics, plating resistance, and plating mass transport losses. Further, the IFB battery capacity is driven by how much solid iron the negative electrode can store. In addition, the IFB battery efficiency is related to the extent of side reactions such as side reactions (3) and (4) on the plating electrode.

IFB redox flow battery systems include stacks of redox flow battery that make up the power modules as well as auxiliary equipment such as piping, pumps, storage tanks, and the like. Both the power modules and the auxiliary equipment may include plastic components and materials such as polyvinyl chloride (PVC), polypropylene (PP), fiber-reinforced plastics including bulk molding compounds (BMC), high-impact polystyrene (HIPS), and the like. Furthermore, each of these plastic materials may include various additives such as mold releases, lubricants, thermal stabilizers, antistatic agents, slip compounds, fillers, flame retardants, antioxidants, scavengers, colorants, and the like. During the life of the redox flow battery system, these additives may solubilize or leach from the plastics into the electrolyte in fluid contact thereat, thereby contaminating the electrolyte and reducing the performance and operational life of the redox flow battery system. Conventional redox flow battery systems typically employ extensive deionized water and/or acidic (e.g., pH ~1) aqueous solutions to wash the redox flow battery system. However, many of the plastic additive contaminants include organic compounds, which are not substantially removed by water and mild acid-water.

The inventors herein have found that the above issues can be at least partially addressed by a method for a redox flow battery, comprising, interrupting cycling of the redox flow battery, including charging the redox flow battery to a threshold charge condition, draining positive and negative electrolyte from the redox flow battery, circulating a wash solution through the redox flow battery, pumping the positive and negative electrolyte to the redox flow battery, and resuming cycling of the redox flow battery. In this way, the technical effect of reducing contamination of the redox flow battery system, thereby prolonging the life and increasing performance of the redox flow battery system, can be achieved. In particular, many more organic contaminants may be more easily degraded and removed by circulating the wash solution through the redox flow battery system, a smaller volume of wash solution may be used to carry out the washing, and washing of the washed redox flow battery system including disposal of the wash solution may be simplified, relative to conventional methods.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
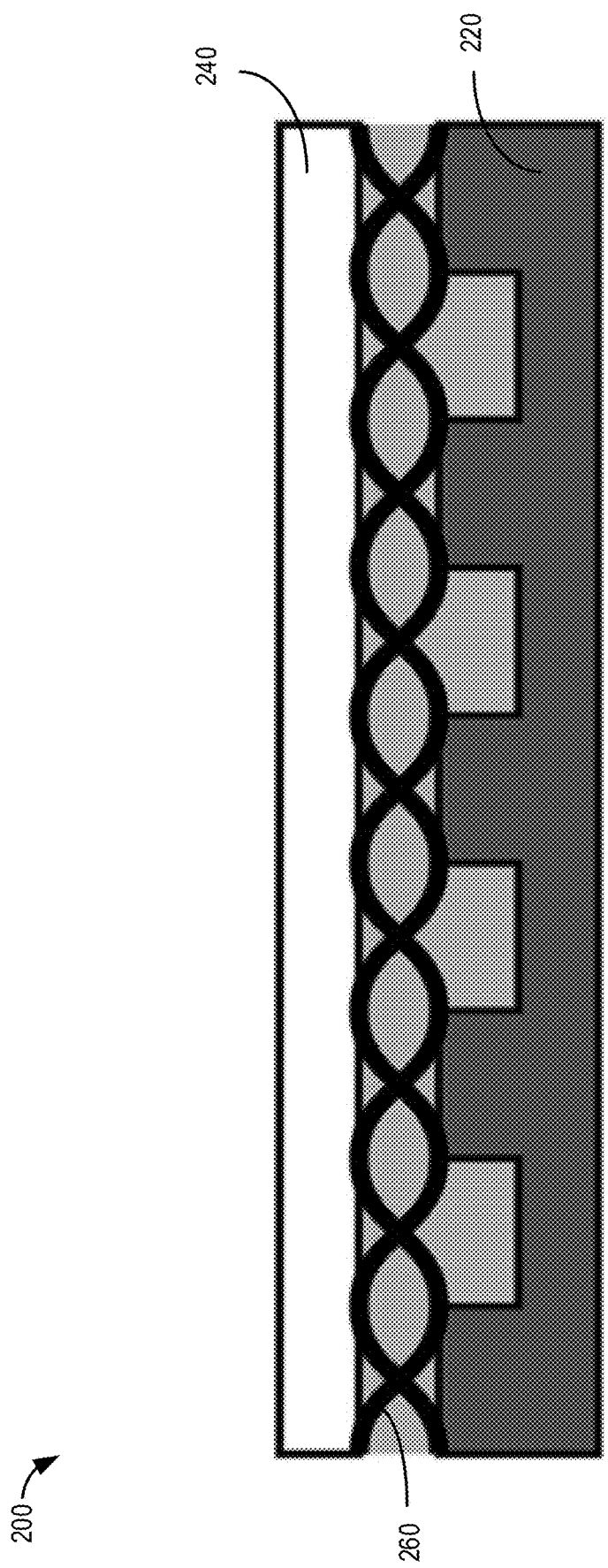
FIG. 2 shows a schematic of a partial cross sectional view of an example plating electrode.
Figure 3:
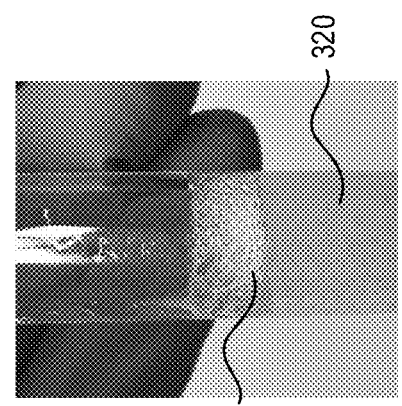
FIG. 3 shows a photograph showing foaming caused by contaminants in an electrolyte solution.
Figure 4:
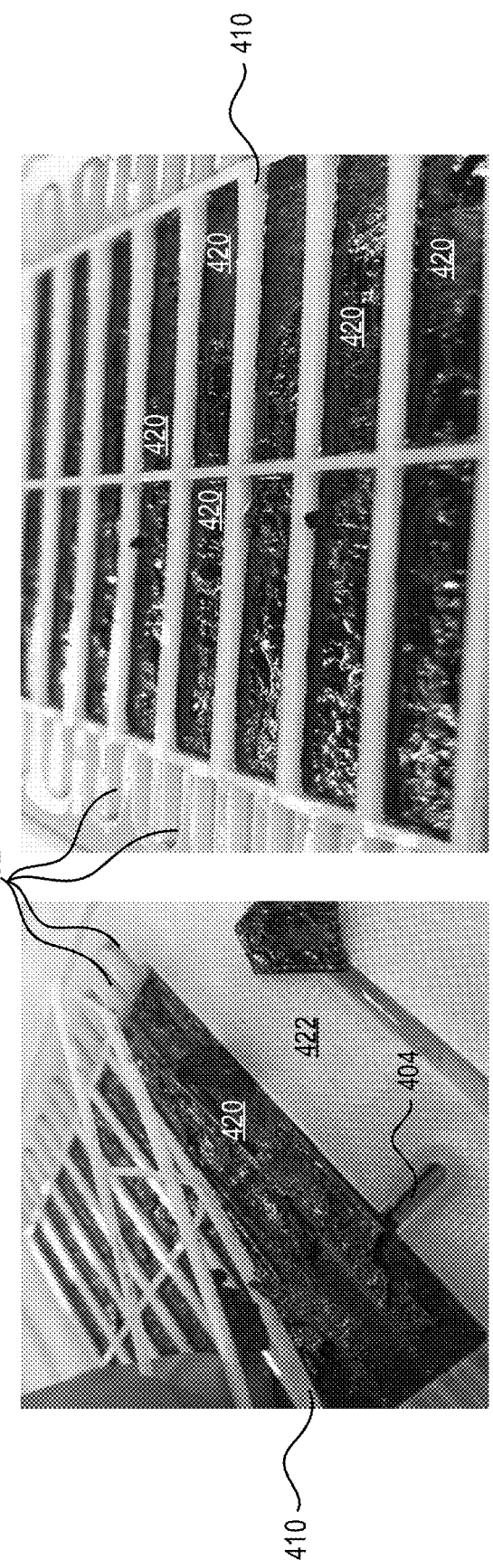
FIG. 4 shows photographs of plating on a negative electrode of a redox flow battery in the presence of contaminated electrolyte.
Figure 5:
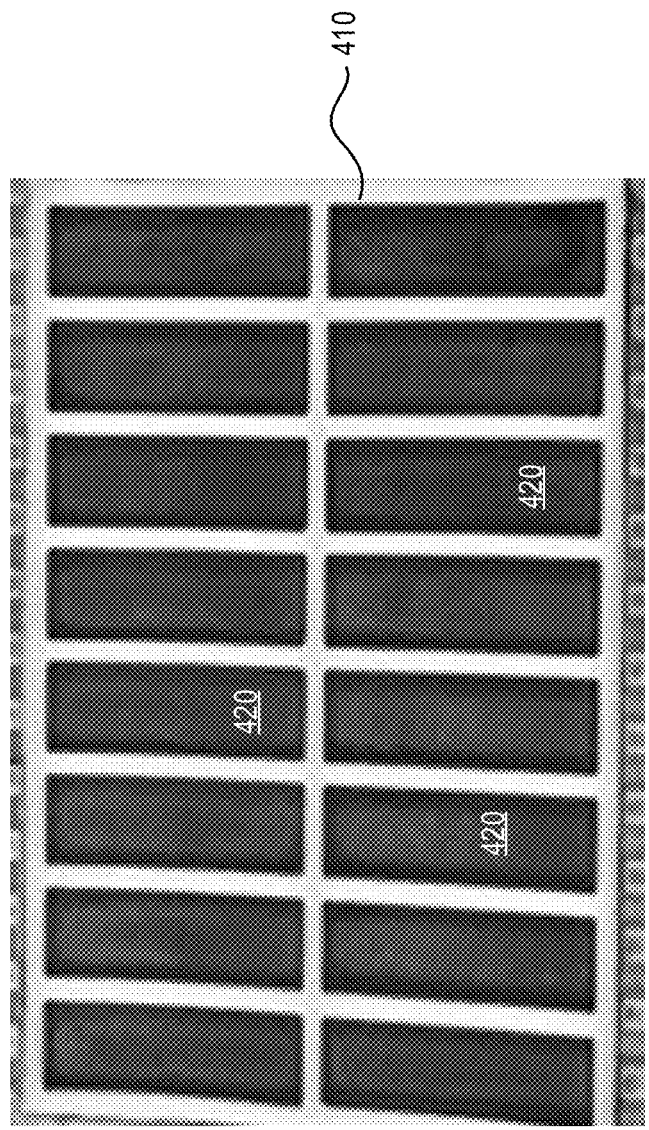
FIG. 5 shows a photograph of plating on the negative electrode of FIG. 4 after electrolyte contaminants are removed.
Figure 7:
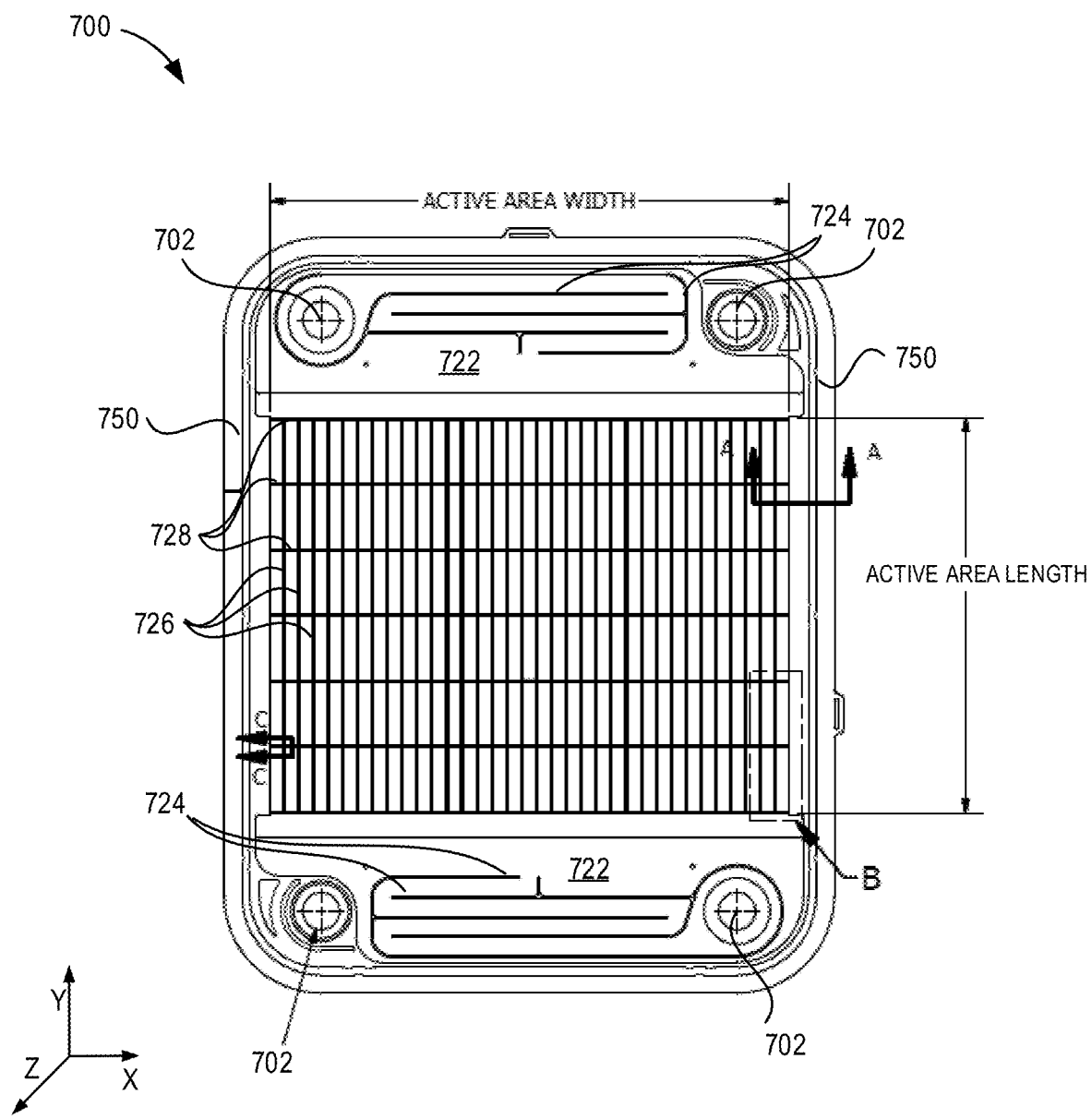
FIG. 7 shows a schematic of a top view of an example electrode configuration.
Figure 8:
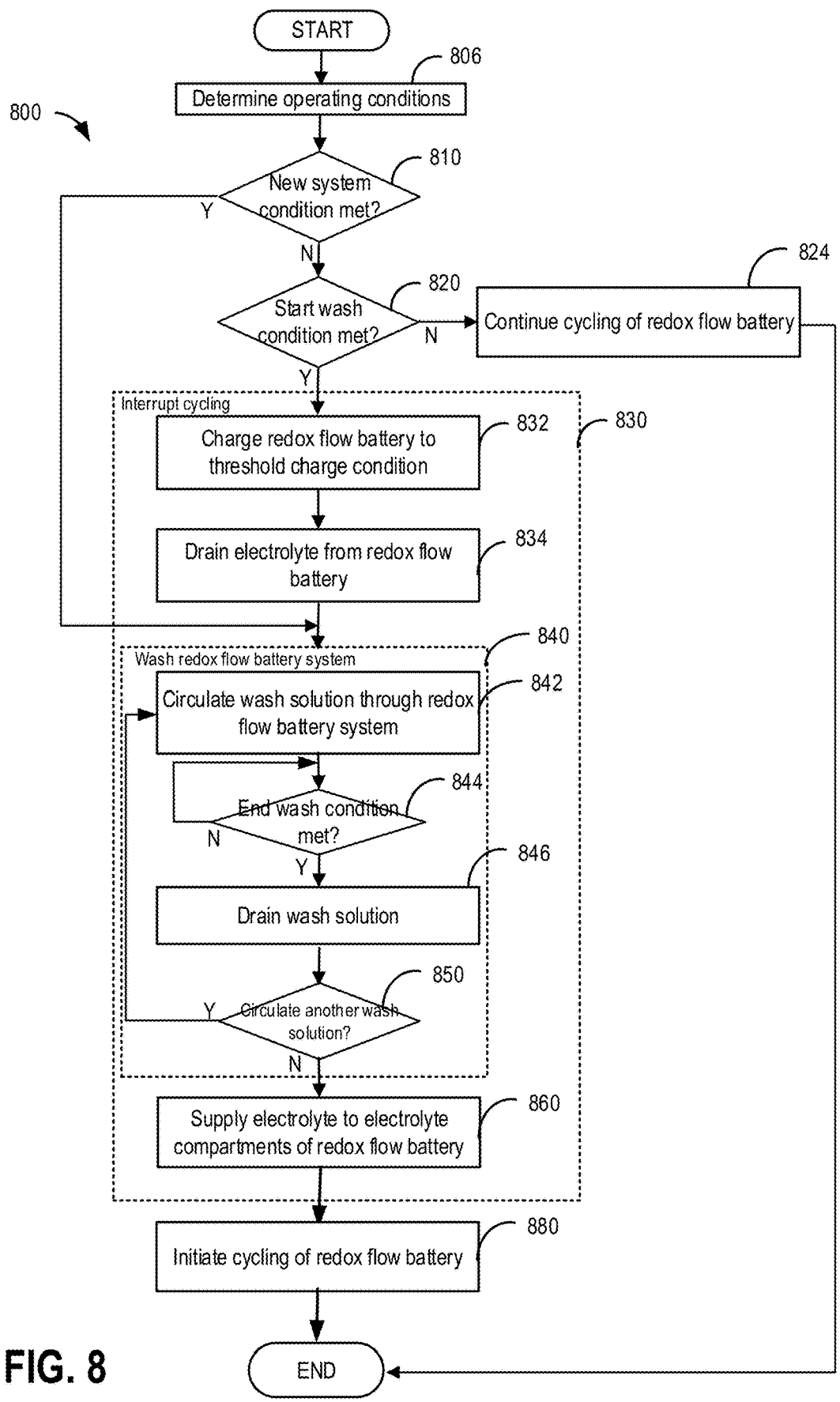
FIG. 8 shows a flow chart for an example method of operating the redox flow battery system of FIG. 1.
Figure 9:
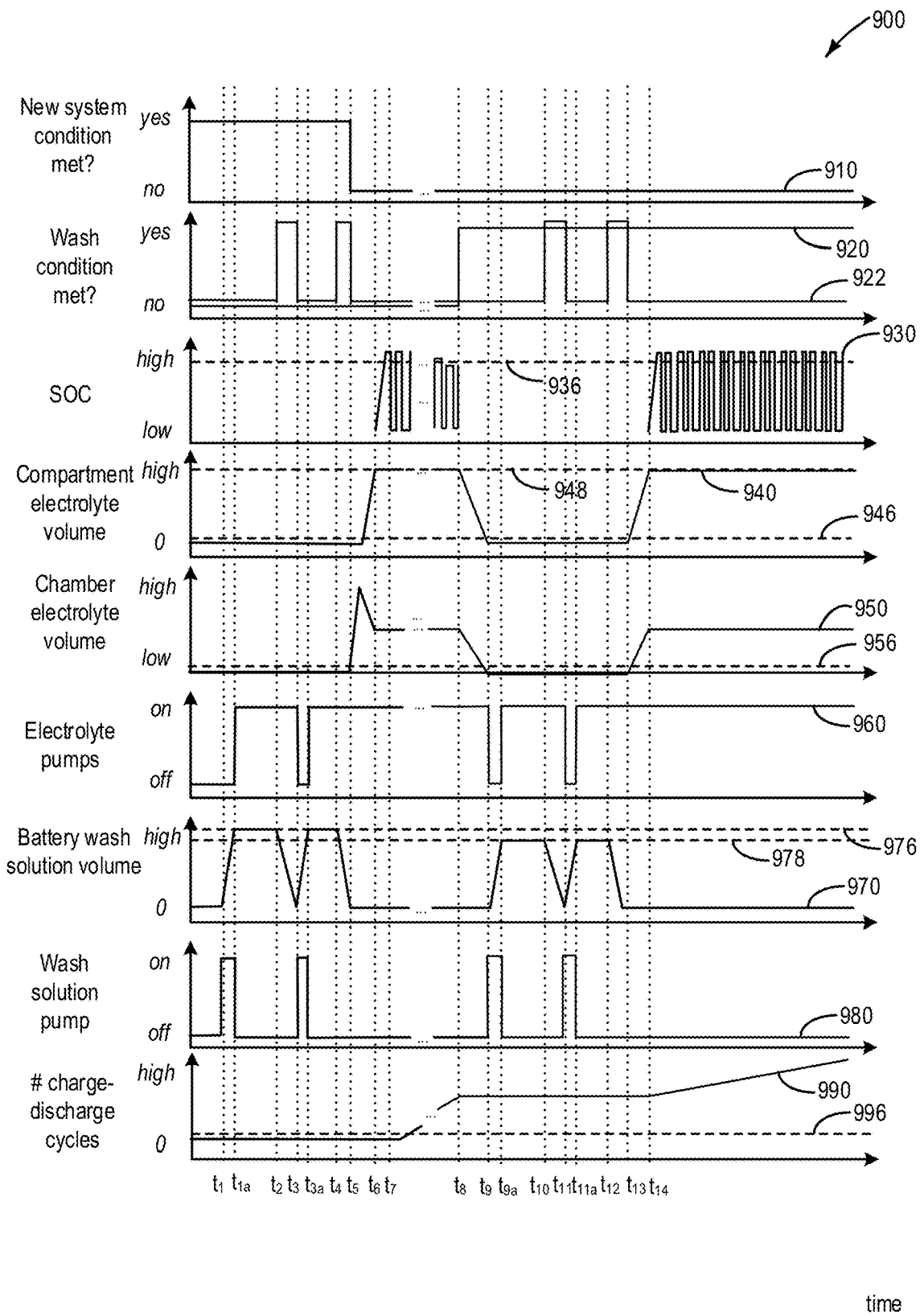
FIG. 9 shows an example timeline corresponding to operating the redox flow battery system of FIG. 1 according to the method illustrated by the flow chart of FIG. 8.

The present disclosure relates to systems and methods for operating a redox flow battery for reducing electrolyte contaminants and for recovering and increasing redox flow battery performance in comparison to current methods and systems. Redox flow battery systems, an example illustrated in FIG. 1, may include an all-iron hybrid redox flow battery (IFB), and may comprise the disclosed redox flow battery system. In one example, the IFB may include a plating electrode mesh, as illustrated in FIGS. 2 and 7. During cycling of the redox flow battery, contaminants can accumulate in the electrolyte and cause foaming of the electrolyte, as shown in FIG. 3, and cracked plating, as shown in FIG. 4. Operating the redox flow battery according to the method of FIG. 8, including circulating a wash solution through the redox flow battery, may aid in removing the electrolyte contaminants, thereby recovering and increasing performance of the redox flow battery, as illustrated by the smooth plating at the plating electrode, as shown in FIG. 5. The increased performance in the redox flow battery during repeated cycling thereof following operation of the redox flow battery according to the method of FIG. 8, including circulating the wash solution through the redox flow battery, is illustrated by the plots in FIGS. 6 and 10. An example timeline illustrating operating conditions of the redox flow battery system of FIG. 1 according to the method of FIG. 8 is shown in FIG. 9.

Figure 1:
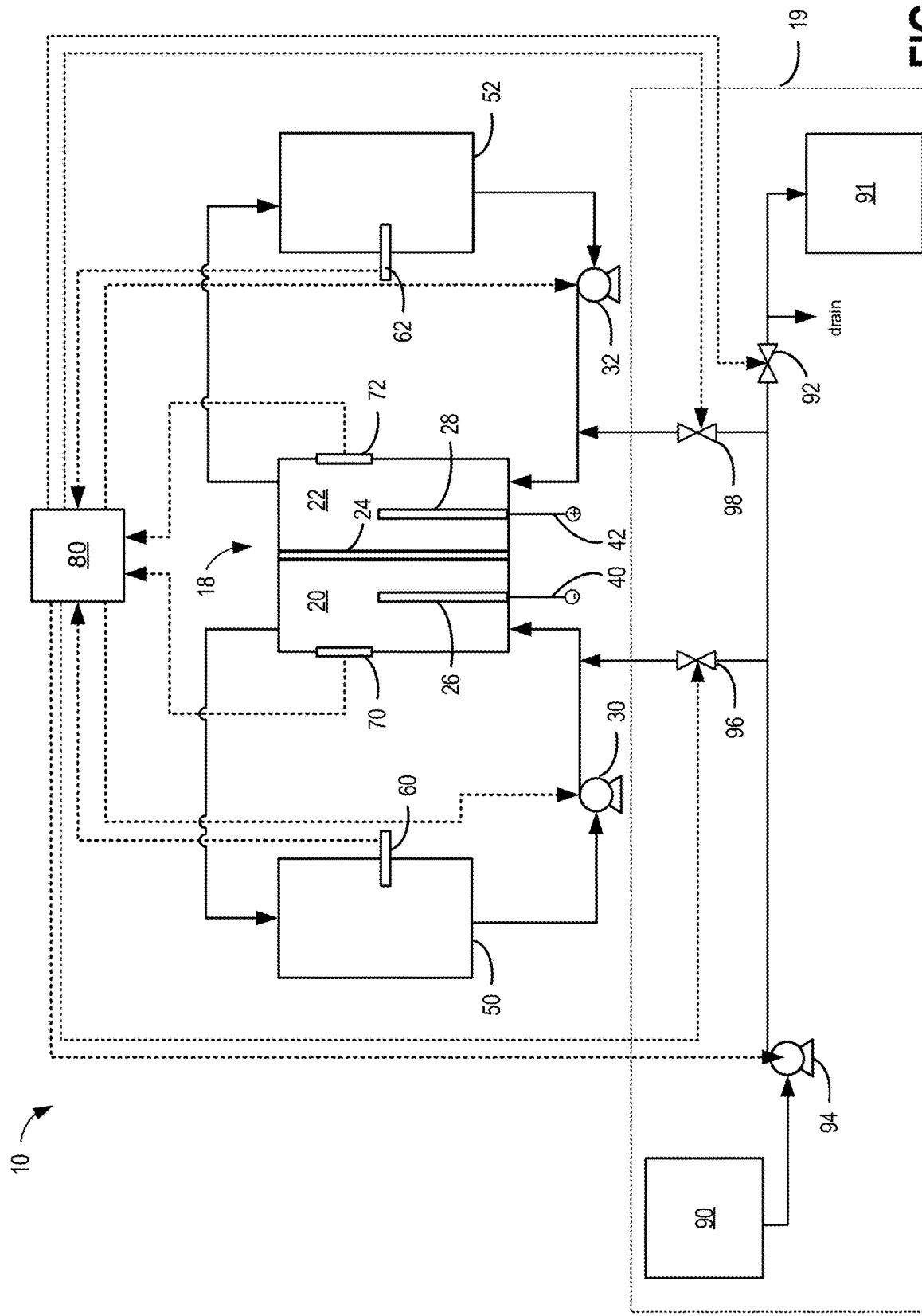
FIG. 1 shows a schematic of an example redox flow battery system.

Turning to FIG. 1, an example schematic of a redox flow battery system 10 is provided wherein a single redox battery cell 18 is illustrated. The single redox battery cell generally includes a negative electrode compartment 20, a positive electrode compartment 22, and a separator 24. The separator 24 is positioned between the negative and positive electrode compartments. In some examples, multiple redox battery cells 18 may be combined in series and/or in parallel to create a higher voltage and/or current in the redox flow battery system.

The negative electrode compartment 20 may comprise a negative electrode 26 and a first electrolyte, also referred to as a negative electrode electrolyte, containing electro-active materials. Similarly, the positive electrode compartment 22 may comprise a positive electrode 28 and a second electrolyte, also referred to as a positive electrode electrolyte, containing electro-active materials.

The separator 24 may comprise an electrically insulating ionic conducting barrier. The separator functions to prevent bulk mixing of the first electrolyte in the negative electrode compartment 20 with the second electrolyte in the positive electrode compartment 22 while still allowing conductance of specific ions there through. In one example, separator 24 may comprise an ion-exchange membrane. In another example, separator 24 may comprise a micro-porous membrane.

The electrolytes may typically be stored in tanks external to the redox battery cell 18. The electrolyte may be pumped via pumps 30 and 32 through the negative electrode compartment 20 and the positive electrode compartment 22 respectively. In the example illustrated in FIG. 1, the first electrolyte is stored at a first electrolyte source 50, which may further comprise an external first electrolyte tank (not shown) and the second electrolyte is stored at a second electrolyte source 52, which may further comprise an external second electrolyte tank (not shown).

In some example redox flow battery systems, the first and second electrolyte sources 50 and 52 may include first and second electrolyte chambers within a multi-chambered storage tank separated by a bulkhead. The bulkhead may create multiple chambers within the storage tank so that both the positive and negative electrolyte may be included separately within a single tank, the first electrolyte chamber 50 holding negative electrolyte comprising electroactive materials, and the second electrolyte chamber 52 holding positive electrolyte comprising electroactive materials. The multi-chambered storage tank may include a gas head space located above the fill height of both the first and second electrolyte chambers 50 and 52, which may be utilized to store hydrogen gas generated through operation of the redox flow battery (e.g., due to proton reduction and corrosion side reactions) and conveyed to the multi-chambered storage tank with returning electrolyte from the redox flow battery cell 18. The hydrogen gas may be separated spontaneously at the gas-liquid interface within the multi-chambered storage tank 110, thereby precluding having additional gas-liquid separators as part of the redox flow battery system. Once separated from the electrolyte, the hydrogen gas may fill the gas head spaces. In this way, utilizing the integrated multi-chambered storage tank may advantageously forego having separate negative and positive electrolyte storage tanks, hydrogen storage tanks, and gas-liquid separators common to conventional redox flow battery systems, thereby simplifying the system design, reducing the physical footprint of the system, and reducing system costs. In some examples, each of the electrolyte sources 50 and 52, either in the case of individual storage tanks or in the case of the integrated multi-chambered storage tank, may include one or more heaters (not explicitly shown in FIG. 1) for heating the electrolyte and for aiding in maintaining the electrolyte temperature. Controller 80 may increase and/or decrease power delivered to the one or more heaters to aid in regulating the electrolyte temperature. Alternately, or additionally, heaters may be positioned in-line with the electrolyte recirculation path, such as in-line with piping therein, to aid in regulating electrolyte temperature by way of controller 80 in the redox flow battery system.

During battery charge, a current is applied to the negative battery terminal 40 and the positive battery terminal 42. During charge, the positive electrode electrolyte is oxidized, loses one or more electrons, at the positive electrode 28, and the negative electrode electrolyte is reduced, and gains one or more electrons, at the negative electrode 26.

During battery discharge, the reverse redox reactions to the charge reactions occur at the electrodes. Thus, during discharge, the positive electrode electrolyte is reduced at the positive electrode 28 and the negative electrode electrolyte is oxidized at the negative electrode 26. In one example, the positive electrode and the negative electrode may be the carbon coated plastic mesh electrode described below.

The electrochemical redox reaction in the negative electrode compartment 20 and the positive electrode compartment 22 maintain an electrical potential difference across the redox flow battery system and can induce a current through a conductor while the reactions are sustained. The amount of energy, the capacity, stored by a redox flow battery system may be limited by the amount of electro-active material in the electrolytes for discharge. The amount of electro-active material is based on the total volume of the electrolytes and the solubility of the electro-active materials. Furthermore, the amount of energy stored by the redox flow battery system may be limited by the amount of solid iron the negative electrode can store.

During operation of the redox flow battery system, sensors and probes may be used to monitor and control chemical properties of the electrolyte, such as electrolyte pH, concentration, state of charge, volume (level) and the like. For example, the redox flow battery system may comprise sensors 60 and 62, which may be positioned to monitor the electrolyte conditions at the first electrolyte source 50 and the second electrolyte source 52 respectively. As another example, the redox flow battery system may comprise sensors 70 and 72, which may be positioned to monitor the conditions at the negative electrode compartment 20 and the positive electrode compartment 22 respectively.

The redox flow battery system may further comprise other sensors positioned at other locations throughout the redox flow battery system to monitor the electrolyte chemical properties and other properties. For example, the redox flow battery system may comprise one or more sensors disposed within an external acid tank, wherein acid may be supplied via an external pump to the redox flow battery system in order to reduce precipitate formation in the electrolytes. The one or more sensors may monitor the acid volume or the pH within the external acid tank. Additional external tanks and sensors may be included for supplying other additives to the redox flow battery system.

The redox flow battery system may be controlled at least partially by a control system including controller 80. The controller 80 may receive sensor information from the various sensors positioned within the redox flow battery system. For example, the controller 80 may actuate pumps 30 and 32 to control the electrolyte flow through the redox battery cell 18. Thus, the controller 80 may be responsive to one or more of the sensors and/or probes positioned throughout the redox flow battery system.

In one example, the redox flow battery system 10 may include washing equipment system 19, including one or more of a wash solution tank 90 for storing a wash solution, wash solution pump 94, control valves 96 and 98, drain valve 92, and holding tank 91. A wash solution pump 94 may be actuated by controller 80 to deliver wash solution to the electrode compartments of the redox flow battery 18 to remove contaminants such as plastics additives leaching into the system. The controller 80 may further open control valves 96 and 98 to allow the wash solution to flow to the redox flow battery system, including negative and positive electrode compartments 20 and 22, respectively, and negative and positive electrolyte chambers 50 and 52. As described above, the presence of plastics additive contaminants can interfere with the plating at the negative electrode, thereby reducing plating and battery charge capacity, plating efficiency, and battery life and performance. In another example, one or more of the components of the washing equipment system 19 may be field service equipment for washing the redox flow battery system. For instance, field service equipment may include one or more of the wash solution tank 90, wash solution pump 94, control valves 96 and 98, holding tank 91, and drain valve 92. The field service equipment may be portable and/or may be removably and fluidly connected to the redox flow battery system for carrying out field service on one or more redox flow battery systems by a field service technician, including removing contaminants by washing. The field service equipment may further include valves such as control valves 92, 96, and 98 for directing fluid flow to and from the redox flow battery system 10 while fluidly connected to the redox flow battery system. During normal battery cycling operation of the redox flow battery system or after washing of the redox flow battery system is completed, the washing equipment system 19 may be fluidly decoupled from the redox flow battery system.

In other examples, the wash solution tank 90 may include a plurality of wash solution tanks 90, each of the wash solution tanks 90 storing a different type of wash solution, such as hydrogen peroxide solution and deionized water. When a plurality of wash solution types is utilized, the controller 80 may coordinate the order of wash solutions utilized. Furthermore, washing the redox flow battery with the plurality of wash solutions may include the controller 80 draining the redox flow battery of liquid (e.g., wash solution and/or electrolyte) before a subsequent wash solution is pumped to the redox flow battery. For example, when washing a redox flow battery system, hydrogen peroxide solution may be circulated through the redox flow battery system following draining of the positive and negative electrolyte therein. Next, the hydrogen peroxide solution may be drained from the redox flow battery prior to circulating deionized water through the redox flow battery.

As depicted in FIG. 1, the controller 80 may open drain valve 92 for draining electrolyte and/or wash solutions from the redox flow battery system. Drained electrolyte may be delivered to a holding tank 91, while drained wash solutions may be delivered to a drain. After washing of the redox flow battery system, the drained electrolyte may be reused by pumping the electrolyte from the holding tank 91 back to the redox flow battery systems. Holding tank 91 may include a plurality of holding tanks such that the drained negative and positive electrolyte may be stored in separate holding tanks.

Hybrid flow batteries are a redox flow battery which may be characterized by the deposit of one or more of the electro-active materials as a solid layer on an electrode. In hybrid flow battery systems, the charge capacity (the amount of energy stored) of the redox battery may be limited by the amount of metal plated during battery charge and may accordingly depend on the efficiency of the plating system as well as the available volume and surface area available for plating.

In the hybrid flow battery system, the negative electrode 26 may be referred to as the plating electrode and the positive electrode 28 may be referred to as the redox electrode. The negative electrode electrolyte within the negative electrode compartment 20 (herein also referred to as the plating side) of the battery may be referred to as the plating electrolyte and the positive electrode electrolyte within the positive electrode compartment 22 (herein also referred to as the redox side) of the battery may be referred to as the redox electrolyte.

As mentioned previously, one example of a hybrid flow battery is an IFB, which uses iron as an electrolyte for plating and redox reactions. The key components present in the IFB are similar to the hybrid flow battery described in FIG. 1, wherein the IFB comprises a benign electrolyte, including iron salts. The benign electrolyte is not too acidic (pH <0) or too alkaline (pH >14) and may have a pH near neutral, for example: IFB negative electrolyte operates between pH of 3-4. As used herein, the phrase pH around neutral provides for a pH range wherein the plastic mesh material used for the disclosed electrode does not degrade in the electrolyte at the potentials applied during charging and discharging of the redox flow battery. The IFB includes a plating electrode, where iron is deposited during charge and de-plated during discharge, a redox electrode, where the ferrous and ferric ions redox reaction occurs, a separator, which prevents electrolytes from mixing and provides an ionic pathway, and electrolytes, where the energy of the IFB is stored. The capacity of an IFB battery may be driven by the amount of electrolytes stored in the external tanks as well as the amount of iron plated on the negative electrode.

The electrochemical redox reactions for an IFB battery are summarized in equations (1) and (2) wherein the forward reactions (left to right) indicate electrochemical reactions during battery charge and the reverse reactions (right to left) indicate electrochemical reaction during battery discharge.

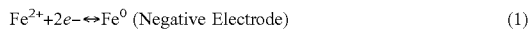

$$Fe^{2+}+2e- \leftrightarrow Fe^0 \text{ (Negative Electrode)} \quad (1)$$

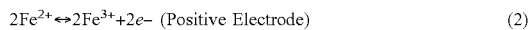

$$2Fe^{2+} \leftrightarrow 2Fe^{3+}+2e- \text{ (Positive Electrode)} \quad (2)$$

On the plating side of the IFB, the plating electrolyte provides a sufficient amount of $Fe^{2+}$ so that during charge, the $Fe^{2+}$ gains two electrons from the negative electrode to form $Fe^0$, which plates onto a substrate. During discharge, the plated $Fe^0$ loses two electrons, ionizing into $Fe^{2+}$ and dissolving back into the plating electrolyte. The equilibrium potential of the negative electrode reaction is −0.44V and thus, reaction (1) provides a negative terminal for the IFB system. On the redox side of the IFB, the redox electrolyte provides $Fe^{2+}$ during charge which loses an electron to the redox electrode and oxidizes to $Fe^{3+}$. During discharge, the $Fe^{3+}$ gains an electron from the redox electrode producing $Fe^{2+}$. The equilibrium potential of the positive electrode reaction is +0.77V, and thus, reaction (2) provides a positive terminal for the IFB system.

Thus, the performance of the IFB system may rely on its plating electrode performance, redox electrode performance, and ohmic resistance loss. On the positive side of the IFB, the redox reaction between $Fe^{2+}$ and $Fe^{3+}$, illustrated by reaction (2), occurs during charge and discharge. Reaction (2) is kinetically fast with minimal side reactions and may not be the limiting factor for the performance of the IFB system.

On the negative side of the IFB, the plating reaction between $Fe^{2+}$ and $Fe^0$, illustrated by reaction (1), occurs during charge and discharge. The ferrous ion, $Fe^{2+}$, gains electrons and plates as solid iron, $Fe^0$, on substrates. This plating reaction may compete with two side reactions: the reduction of hydrogen protons H+(reaction (3)), wherein two hydrogen protons each accept a single electron to form hydrogen gas, $H_2$, and the corrosion of deposited iron metal to produce ferrous ion $Fe^{2+}$ (reaction (4)), respectively:

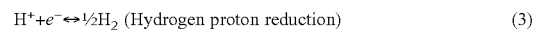

$$H^++e^- \leftrightarrow \tfrac{1}{2}H_2 \text{ (Hydrogen proton reduction)} \quad (3)$$

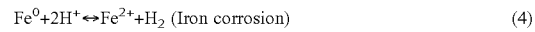

$$Fe^0+2H^+ \leftrightarrow Fe^{2+}+H_2 \text{ (Iron corrosion)} \quad (4)$$

Both side reactions may reduce the overall battery efficiency, because electrons transferred to the negative electrode may be consumed by hydrogen production first rather than by iron plating. Furthermore, these side reactions may result in imbalanced positive electrolytes, which may further result in battery capacity loss over time. In addition, the generated $H_2$ may be trapped in the negative electrode which may in turn, reduce the electrochemical active area and may significantly increase electrode overpotentials.

Reaction (1) is kinetically slower than reaction (2) and may be the limiting factor for the performance of the IFB system. During charging and discharging cycles, the potential across the electrode may be low when compared to other redox battery systems. It should be noted that the plating kinetics of other battery systems may be the limiting factor for battery performance.

Although not shown in FIG. 1, the redox flow battery system 10 may include electrolyte rebalancing systems fluidly connected in-line with the recirculating flow paths of the electrolyte at the negative and positive sides of the battery, respectively, in the redox flow battery system 10. The rebalancing systems may include catalyst material for contacting hydrogen gas and ferric ion delivered thereto, whereby the ferric ion is reduced to ferrous ion at the catalyst surface to correct for charge imbalance and changes in electrolyte pH arising from side reactions (3) and (4).

Turning to FIG. 2, it illustrates a cross-sectional view of an example plating electrode configuration for a redox flow battery system 10, including a meshed redox or plating electrode 260 interposed between a membrane separator 240 and flow field plate 220. The flow field plate may include an inter-digitated flow field (IDFF) or other flow field configuration to aid in more uniformly distributing electrolyte across the surfaces of the redox or plating electrode 260. The meshed redox or plating electrode may include carbon paper, Ti mesh, coated plastic mesh materials such as carbon-coated plastic mesh, and the like. Other example mesh coating materials include metal oxides (such as $TiO_2$) and/or hydrophilic polymers (such as sulfonated PEEK or perfluorosulfonic acid (PFSA)). The plastic mesh may be made from a variety of plastics. In one example, the plastic mesh material may be polypropylene (PP). In another example, the plastic mesh material may be polyolefin.

The coating material may be selected from any commercially available carbon ink. For example, the carbon material may be a carbon ink selected from Electrodag, C220, C120-24, and CM112-48. These coating materials may change the base plastic material from hydrophobic to hydrophilic. As such, a hydrophilic mesh may reduce the amount of hydrogen bubbles trapped in the plastic mesh, which may aid in averting ohmic resistance increases local to the electrode surface caused by hydrogen bubbles trapped thereat. In some embodiments, the plastic mesh may be a unipolar mesh. In other embodiments, the plastic mesh may be a bipolar mesh. In yet other embodiments, the plastic mesh may be a woven mesh. In still further embodiments, the plastic mesh may be a stretched mesh. A coated plastic mesh electrode may aid in increasing plating performance (e.g., plating uniformity and capacity) by increasing the electrode conductivity and reducing ohmic resistance at higher current density regions, and reducing overpotential relative to a Ti mesh baseline level.

The ohmic resistance of the electrode is the combined ionic resistance and electrical resistance of the redox or plating electrode 260, where ionic resistance is determined by electrolyte resistivity, mesh open area and mesh thickness while the electrical resistance is determined by coating type, thickness and mesh wire size. When a non-conductive coating is used, the ohmic resistance of redox or plating electrode 260 is only the ionic resistance through the electrolyte. The coated plastic mesh electrode dimensions may be optimized for performance within a redox flow battery.

Turning now to FIG. 7, it illustrates a top view of another alternative representation of an electrode configuration, including a negative electrode spacer 700. Negative electrode spacer 700 may be positioned within a redox flow battery stack assembly between membrane and the negative flow field plate. Negative electrode spacer 700 includes an active area having a plurality of main ribs 726 oriented more parallel to an active area length, and a plurality of support ribs 728 oriented more parallel to an active area width. The active area of the negative electrode spacer 700 may refer to the area of the negative electrode spacer 700 delineated by the main ribs 726 and the support ribs 728, where negative electrolyte contacts and flows between the membrane and the negative flow field plate in the redox flow battery stack assembly and where the electrolyte species participate in redox reactions. The negative electrode spacer 700 may further include an inactive perimeter region 722 surrounding the active region that may contact the electrolyte but where no redox reactions take place. The negative electrode spacer 700 may include a plurality of inlet and outlet openings 702 positioned in the inactive perimeter region 722. Electrolyte fluid may be conveyed to the negative flow field from the inlets and from the negative flow field to the outlets by way of various channels 724 or flow conduits integrated into the layers of the electrode stack assembly, including the negative electrode spacer. For the case where the main ribs 726 are oriented parallel to the length of the negative electrode spacer (y-axis) the main rib length is equivalent to the active area length; for the case where the support ribs 728 are oriented parallel to the width of the negative electrode spacer (x-axis) the support rib length is equivalent to the active area width.

Turning to FIG. 3, it shows a photograph 300 of electrolyte 320 from a used redox flow battery with plastics additive contaminants such as mold releases, plasticizers, flame retardants, antioxidants, acid scavengers, light and heat stabilizers, lubricants, pigments, antistatic agents, slip compounds and thermal stabilizers. The plastics additives may leach into the electrolyte fluid from plastic components of the flow battery system including electrode spacer, battery module framing, tank walls, piping, valve and pump bodies, and the like. The presence of the plastic additive contaminants is evident from the foam layer 324 observed on the surface of the electrolyte 320.

Turning to FIG. 4, it shows two perspective-view photographs 400 and 450, of a plating electrode configuration of a redox flow battery power module, including an electrode spacer 422 with flow channels 402, inlet/outlet openings 404, and active area mesh 410. The power module is contaminated with plastic additives that leached into the electrolyte during cycling of the redox flow battery. The photograph 400 at left shows the active area mesh 410 peeled back to expose the electrode with plating material 420 thereunder. As can be observed in both photographs 400 and 450, the plating surface is rough, uneven, and cracked, which can increase a risk of shorting during battery cycling, thereby reducing performance of the redox flow battery system. In addition, the photograph 400 at left also shows poor adhesion of the plating material to the active area mesh 410, which can result in reduced battery capacity. The plastic additive contaminants leached from the system are present in the negative electrolyte when the battery is in a discharged state, and are entrained and attached to the plating during charging and plating. In some examples, the contaminants leached into the electrolyte may cause cracked plating or plating with poor adhesion of the plated material to the (carbon) bipolar plates of the plating electrode. The plastic additive contaminants leached out into the positive electrolyte are filtered by activated carbon present in the electrolyte rebalancing systems and positive electrodes and may accumulate at the power module electrodes.

Turning to FIG. 5, it shows a photograph 500 of the redox flow battery power electrode spacer 422, with the same amount of plating as shown in FIG. 4, following washing of the redox flow battery system with wash solution. Washing the redox flow battery system may include fluidly contacting the wash solution with the surfaces of system plumbing (e.g., valves, piping), pumps, electrolyte rebalancing systems, and the power module, including but not limited to, each of the positive and negative electrode compartments 20 and 22, positive and negative electrodes 26 and 28, plating material 420, active area mesh 410, positive and negative flow field plates and electrode spacer 422. Following washing of the redox flow battery system with the wash solution (hydrogen peroxide solution followed by deionized water), upon resuming cycling (e.g., discharging and charging) of the redox flow battery, the Fe plating quality of the plating material 420 at the plating electrode has increased substantially; the plating material is smooth and uncracked across the entire electrode surface.

Figure 6:
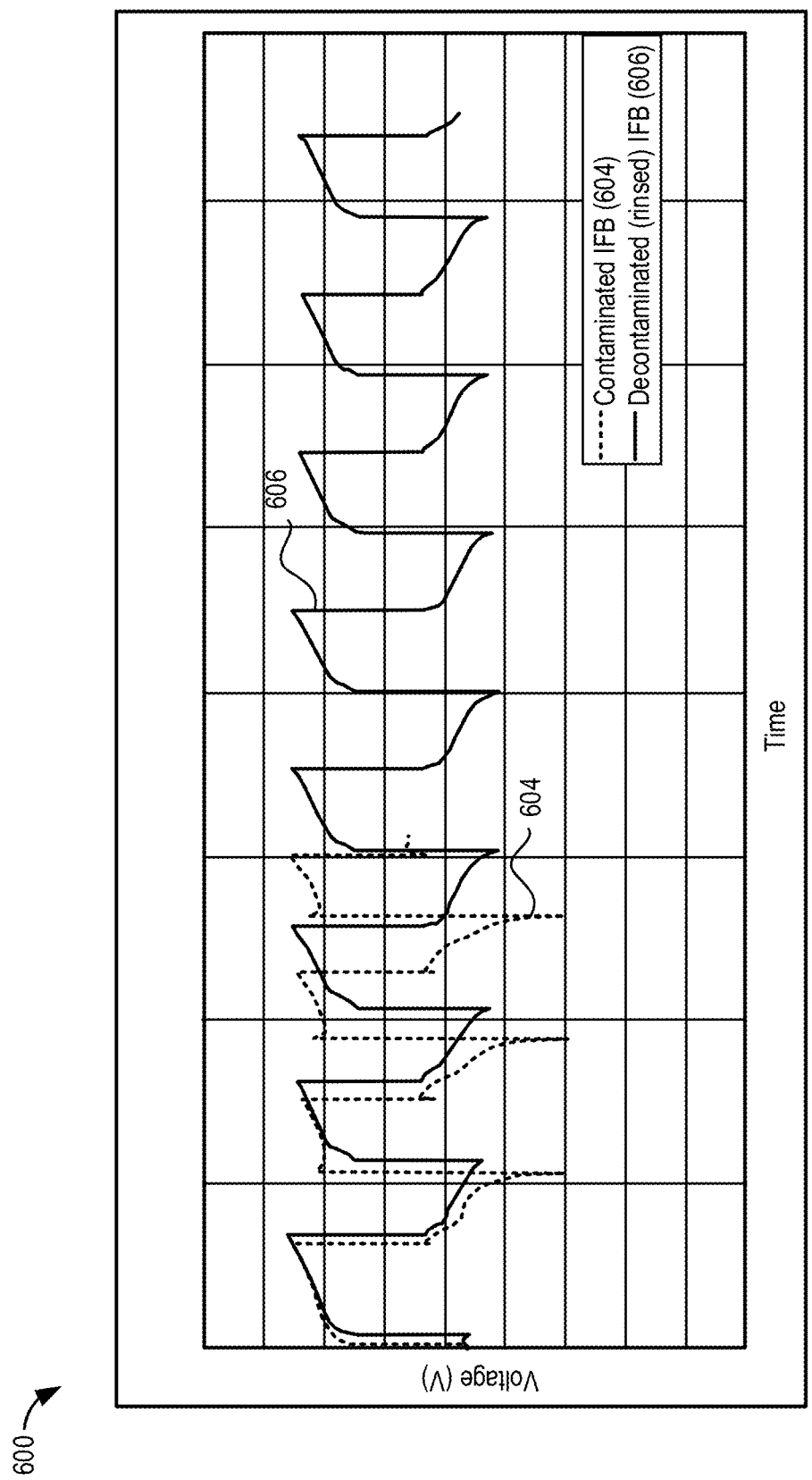
FIGS. 6 and 10 show plots of redox flow battery performance comparing contaminated and uncontaminated electrolyte.

Turning to FIG. 6, it illustrates a plot 600 comparing the voltage cycling performance of the contaminated redox flow battery system represented in FIG. 4 (trend line 604) and the same redox flow battery system using the same electrolyte, but decontaminated by washing with the wash solution represented in FIG. 5 (trend line 606). Prior to washing of the redox flow battery, the redox flow battery system exhibits cycle to cycle efficiency and performance degradation as the system becomes contaminated by plastics additives, as shown by trend line 604. Furthermore, following washing of the redox flow battery system, the cycle to cycle efficiency and performance losses are mitigated and overall redox flow battery efficiency is increased by more than 15%. In particular, the decontaminated redox flow battery system (e.g., trend line 606) exhibits a longer charge/discharge cycle time, indicating increased overall battery capacity relative to the contaminated redox flow battery system (e.g., trend line 604). The increased charge/discharge cycle time is likely due to the increase in Fe plating quality following removal of the contaminants from the redox flow battery system. Furthermore, with the same electrolyte, the decontaminated redox flow battery system exhibits 98% Coulombic efficiency, while the contaminated redox flow battery system exhibits 80% Coulombic efficiency, due to lower discharge voltage. Further still, the decontaminated redox flow battery system exhibits a lower charge voltage as well as a higher discharge voltage relative to the contaminated redox flow battery system, which is evidence of reduced ohmic resistance due to the removal of organic contaminants from the membrane separator and electrodes of the power module.

Figure 10:
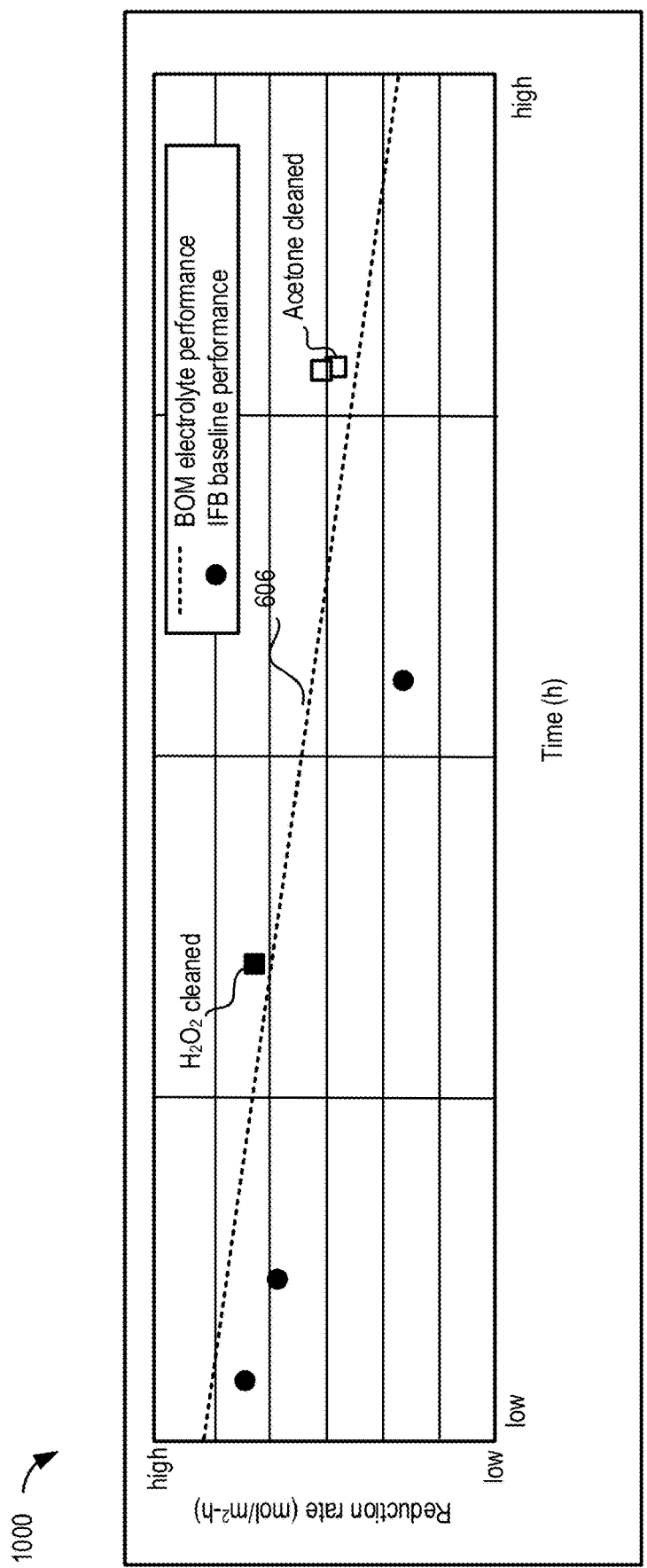

Turning to FIG. 10, it illustrates a plot 1000 comparing the reduction rate performance of a redox flow battery system prior to and following washing with the wash solution. Without washing the redox flow battery system with wash solution as described herein (e.g., wash with hydrogen peroxide solution followed by deionized water), the performance of the redox flow battery declines steadily with time after repeated cycling, as shown by the dotted trend line for a typical BOM electrolyte, and by the filled circles for IFB electrolyte. After washing the redox flow battery system, as described in detail herein, the reduction rate performance of the redox flow battery system is increased. Washing with solvents such as acetone and isopropyl alcohol (IPA) recovers a lower reduction rate performance as compared to washing with the hydrogen peroxide solution. Furthermore, circulating either acetone or IPA through the redox flow battery system can damage the power module components, including the cation exchange membrane coating, thereby reducing a useable life and reducing performance of the redox flow battery system. Further still, both acetone and IPA are volatile organic compounds that are highly flammable and thus present increased difficulties in disposal and handling.

The wash solution may include one or more wash solutions. As further described herein, in one embodiment, the one or more wash solutions include hydrogen peroxide solution and deionized water. The concentration of the hydrogen peroxide may be greater than a lower threshold concentration and less than an upper threshold concentration. In one example, the upper threshold concentration may be 30 wt. % and the lower threshold concentration may be 3 wt. %. In another example the upper threshold concentration may be 10 wt. %. For example, a preferred concentration of hydrogen peroxide may be from 3 wt. % to 5 wt. % in the hydrogen peroxide solution. When the concentration of hydrogen peroxide is above the lower threshold concentration, the contaminants may be more efficiently and effectively removed from the system.

Washing the redox flow battery system with a higher concentration of hydrogen peroxide may aid in reducing a volume of wash solution circulated through the redox flow battery system; however, because oxidation of contaminants by the peroxide can be exothermic, the temperature of the redox flow battery can increase during washing. When the concentration of hydrogen peroxide is above the upper threshold concentration, the temperature of the redox flow battery may increase above a threshold temperature during washing. When the temperature of the redox flow battery system rises above an upper threshold temperature, components of the redox flow battery system can be degraded, reducing battery performance. For example, PVC piping components can degrade above an upper threshold temperature of 70 degrees Celsius. In one example, the upper threshold temperature includes 60 degrees Celsius. By maintaining the concentration of hydrogen peroxide below the upper threshold concentration, a rate of exothermic heat generated during washing can be reduced, thereby decreasing a temperature rise of the redox flow battery system. In this way, the redox flow battery system temperature may be maintained below the upper threshold temperature. In one embodiment a redox flow battery system temperature may be maintained at approximately 55 degrees Celsius.

In some examples, the concentration of the hydrogen peroxide solution may be adjusted in response to a level of contamination of the redox flow battery system. For example, for more highly contaminated (e.g., longer operation of the redox flow battery system prior to washing) systems, the contaminant concentration in the redox flow battery system may be higher, and an upper threshold concentration of hydrogen peroxide may be lowered to reduce a rate of oxidation of contaminants during washing, thereby reducing a rate of exothermic heat generation and reducing a temperature rise in the redox flow battery system. In contrast, for less highly contaminated systems, the contaminant concentration in the redox flow battery system may be lower, and an upper threshold concentration may be higher to increase a rate of oxidation of contaminants during washing, thereby increasing a rate of contaminant oxidation, while still maintaining a low enough rate of exothermic heat generation so that a temperature of the redox flow battery system does not increase above the threshold temperature.

As described below, following draining of the electrolyte, the contaminated redox flow battery may be washed with a threshold volume of the hydrogen peroxide solution for a first threshold duration. Following draining of the hydrogen peroxide solution, the redox flow battery may be washed with a threshold volume of the deionized water for a second threshold duration. For washing a new redox flow battery system, the threshold volume of hydrogen peroxide solution may include 1000 L, and a first threshold duration may include 1 h, when a concentration of hydrogen peroxide solution is from 3 to 5 wt. %. For washing a used redox flow battery system, the threshold volume of hydrogen peroxide solution may include from 1000 L to 5000 L, and a first threshold duration may include 1 h, when a concentration of hydrogen peroxide solution is from 3 to 5 wt. %. When washing a used system, the threshold volume of hydrogen peroxide may be adjusted based on severity of the contamination. When the level of contamination is higher, the threshold volume of hydrogen peroxide solution may be higher; conversely, when the level of contamination is lower, the threshold volume of hydrogen peroxide solution may be lower.

The threshold volume of the hydrogen peroxide solution may be also adjusted based on the concentration of the hydrogen peroxide solution, whereby the threshold volume is increased for a lower concentration, and vice versa. Furthermore, the threshold volume of hydrogen peroxide solution may be adjusted based on a volume, or capacity of the redox flow battery, whereby the threshold volume is increased with increasing volume or capacity of the redox flow battery. In another example, circulation of the hydrogen peroxide wash solution through the redox flow battery system may be continued until an end wash condition for the hydrogen peroxide solution is met. The hydrogen peroxide solution end wash condition may include one or more of when a threshold volume of hydrogen peroxide solution has been circulated through the system, when the hydrogen peroxide solution has been circulated through the redox flow battery system for a first threshold duration, and/or when a temperature of the redox flow battery system decreases below a lower threshold temperature.

The lower threshold temperature may include ambient temperature. In another example, the lower threshold temperature may be determined by adding a threshold temperature rise to the temperature of the redox flow battery system just prior to the start of washing. In one example, the threshold temperature rise may be less than 1 degree, preferably less than 0.5 degrees, more preferably less than 0.1 degrees wherein the smaller temperature rise indicates the presence of fewer and fewer contaminants present in the system and reacting with the was solution. The temperature rise may be measured by positioning a temperature sensor such as a thermocouple in fluid contact with the hydrogen peroxide flow. During washing, the temperature of the redox flow battery system decreasing below the lower threshold temperature indicates that a concentration of undegraded (e.g., unwashed) contaminants has been reduced so that the exothermic heat generated from the washing is low.

Circulation of the deionized water through the redox flow battery system may be continued until an end wash condition for the deionized water is met. The end wash condition for the deionized water may include one or more of when a threshold volume of deionized water has been circulated through the system and when the wash solution has been circulated through the redox flow battery system for a second threshold duration. The second threshold duration and/or threshold volume of deionized water may be determined at least partially based on the first threshold duration and/or threshold volume of hydrogen peroxide. For example, the second threshold duration may be longer when the first threshold duration is longer, and the second threshold duration may be shorter when the first threshold duration is shorter. Furthermore, the threshold volume of deionized water may be larger when the threshold volume of hydrogen peroxide solution is larger since more deionized water may be used to rinse the residual hydrogen peroxide solution with degraded contaminants from the system. Conversely, the threshold volume of deionized water may be smaller when the threshold volume of hydrogen peroxide solution is smaller since less deionized water may be used to rinse the residual hydrogen peroxide solution with degraded contaminants from the system.

In another example the end wash condition for stopping washing with one or more of the deionized water and hydrogen peroxide wash solutions may be based on when a number of recirculation passes of the wash solution through the redox flow battery system exceeds a threshold number of recirculation passes. The number of recirculation passes, N, may be determined according to equation (5):

$$N = \frac{t}{V/Q}, \text{ where} \quad (5)$$

V represents an effective wash volume, including the volume of system plumbing, pumps, and power module through which the wash solution is circulated at a volumetric flow rate, Q. The threshold number of recirculation passes may be different for each wash solution type (e.g., deionized water, hydrogen peroxide). Furthermore, the volumetric flow rate, Q, may be maintained above a lower threshold volumetric flow rate during washing in order to maintain turbulent flow through the volume of system plumbing, pipes, and power module so that turbulent mixing and fluid contact between the wash solutions and the surfaces of the redox flow battery system to be washed is increased. Turbulent flow may also aid in reducing concentration gradients at the liquid-solid interfaces which can reduce washing efficiency. The volumetric flow rate, Q, may be maintained below an upper threshold volumetric flow rate during washing in order to reduce pumping costs and risks of damaging power module components. Maintaining Q below the upper threshold volumetric flow rate during washing may further aid in increasing contact time between the wash solution and the contaminated surfaces in the redox flow battery system, thereby increasing an efficiency of the washing process.

Turning to FIG. 8, it illustrates a flow chart for a method 800 of operating a redox flow battery system 10. Instructions for carrying out method 800 (e.g., operating the redox flow battery system to wash the redox flow battery) and the rest of the methods included herein may be executed by a controller (e.g., controller 80) based on instructions stored on a non-transitory memory of the controller and in conjunction with signals received from sensors of the redox flow battery system 10 such as the sensors described above with reference to FIG. 1. The controller may employ actuators of the redox flow battery system, such as the actuators described above with reference to FIG. 1, to adjust operation thereof, according to the methods described below.

Method 800 begins at 806 where the controller 806 determines various redox flow battery system operating conditions such as state-of-charge (SOC), number of charge-discharge cycles, electrolyte pump status, wash pump status, output voltage, charge capacity, and the like. Method 800 continues at 810 where the controller 80 determines if a new system condition is met. A new system condition may be met when a number of charge-discharge cycles of the redox flow battery system is less than a lower threshold number of cycles. In one example, the lower threshold number of cycles may include 1 charge-discharge cycle. In another example, the new system condition may include the volume of electrolyte in the redox flow battery electrode compartments 20 and 22 being less than a lower electrolyte threshold volume. The lower threshold compartment electrolyte volume may include when electrolyte is absent from the redox flow battery electrode compartments, such as before the redox flow battery system is exposed to any electrolyte. In another example, the new system condition may include the volume of electrolyte in the redox flow battery electrolyte chambers 50 and 52 being less than a lower threshold chamber electrolyte volume. The lower threshold chamber electrolyte volume may include when electrolyte is absent from the redox flow battery electrolyte chambers. In other words, a new system condition may be met when a redox flow battery electrolyte chambers has not been filled with electrolyte and/or prior to the redox flow battery system being charged.

For the case where the new system condition is not met, method 800 continues at 820 where the controller 80 determines if a start wash condition is met. The start wash condition may be met when a redox flow compartment electrolyte volume is above a lower threshold compartment electrolyte volume and/or a number of charge-discharge cycles is greater than a lower threshold number of cycles, indicating that the redox flow battery system is used and has accumulated electrolyte contaminants.

In another example, the start wash condition may be met when a charge capacity of the redox flow battery system fall below a threshold SOC. The charge capacity may refer to the redox flow battery system SOC at the top-of-charge. The top-of-charge may refer to when a charge current supplied to the redox flow battery system at a constant charge voltage approaches zero or decreases below a lower threshold charge current. Additionally or alternatively, the top-of-charge may refer to an electrolyte SOC approaching a threshold electrolyte SOC. The threshold SOC may correspond to a fraction of the charge capacity of a new redox flow battery system, such that the redox flow battery system falling below the threshold SOC indicates a contaminated redox flow battery system. In one example, the threshold SOC may include 90% of the charge capacity of a new redox flow battery system.

In another example, the start wash condition may be met when a discharge voltage of the redox flow battery system falls below a threshold discharge voltage. In one example, the threshold discharge voltage may correspond to 90% of the discharge voltage for a new redox flow battery system. In another example, the start wash condition may be met when the discharge power of the redox flow battery system falls below a threshold discharge power. The threshold discharge power may be dependent on the SOC of the redox flow battery system, such that the threshold discharge power may increase with increasing SOC and decrease with decreasing SOC. In one example, the threshold discharge power at a particular SOC may correspond to 90% of the discharge power at the particular SOC for a new redox flow battery system.

In another example, the start wash condition may be met in response to one or more of a change in other redox flow battery performance indicators, including qualitative indicators. For example, the start wash condition may be met when the electrolyte exhibits an organic odor, the electrolyte becomes cloudy following a cleaning battery cycle, the presence of foaming in the electrolyte is observed, and/or when a battery cell becomes clogged, indicating the presence of substantial organic contaminants.

For the case where the start wash condition is met at 820, method 800 continues at 830, where the controller 80 interrupts cycling (e.g., charge-discharge) of the redox flow battery system, including charging the redox flow battery system to the threshold charge condition at 832. In one example, the threshold charge condition may include charging the redox flow battery to the top-of-charge. As described above, charging the redox flow battery system to the top-of-charge may aid in accumulating contaminants in the negative electrolyte at the plating material during plating (e.g., charging) at the negative electrode. At the positive side of the redox flow battery system, plastic contaminants leached into the positive electrolyte may be filtered at the power module electrode (e.g., positive electrode). In some examples, interrupting the cycling of the redox flow battery system can further include reducing power to heaters, including switching off heaters, positioned in electrolyte sources 50 and 52, or positioned in-line with the electrolyte recirculation path. Reducing power to the heaters may aid in reducing a risk of the electrolyte temperature increasing above a threshold temperature. In some embodiments, interrupting cycling may include switching OFF in-line heaters, while reducing power and/or maintaining heaters ON in electrolyte sources 50 and 52.

Method 800 continues at 834 where the electrolyte is drained from the redox flow battery. In one example, the controller 80 may activate pumps 30 and 32 to drain negative and positive electrolyte from the negative and positive electrolyte from the negative and positive electrode compartments, respectively. The drained electrolyte may be stored in a storage tank, such as holding tank 91, and returned and reused in the redox flow battery system 10 following washing.

Returning to 810 for the case when the new system condition is met and following draining of electrolyte from the redox flow battery system at 834, method 800 continues at 840, where the redox flow battery system is washed. Washing the redox flow battery system may include circulating one or more wash solutions through the redox flow battery system at 842. For example, controller 80 may open one or more control valves 96 and 98 and actuate wash solution pump 94 to deliver wash solution to the redox flow battery system. Circulating wash solution through the redox flow battery system at 842 may include fluidly contacting each of the components and surfaces of the system such as plumbing (e.g., pipes, valves), rebalancing systems, pumps, and the power module, including negative and positive electrodes 26 and 24, bipolar mesh spacer, field flow plates, negative and positive electrode compartments 20 and 22, and inlet, outlet and connective piping between each battery of a redox flow battery system power module. Furthermore, the wash solution may be circulated to surfaces external to the power module that may be a source of electrolyte contaminants, such as to the auxiliary equipment including first and second electrolyte chambers 50 and 50, rebalancing systems, and electrolyte pumps 30 and 32.

As described herein a sequence of wash solutions may be utilized to more efficiently remove contaminants from the redox flow battery system. For example, the sequence of wash solutions may include circulating hydrogen peroxide solution through the redox flow battery system to oxidize and degrade the contaminants therein. As described above, a concentration of hydrogen peroxide solution may be below an upper threshold concentration to reduce an exothermic temperature rise during washing, and above a lower threshold concentration to increase washing effectiveness and efficiency. Washing the redox flow battery system with deionized water may be performed following washing with hydrogen peroxide solution, in order to remove residual hydrogen peroxide solution and contaminants from the system. The wash solutions may be circulated above a threshold volumetric flow rate above a threshold volumetric flow rate in order to increase mixing and fluid-solid contact between the wash solution and the surfaces to be washed, and to decrease concentration gradients at the liquid-solid interfaces. The threshold volumetric flow rate may be different for each wash solution type. For example, the threshold volumetric flow rate corresponding to the hydrogen peroxide wash solution may be higher than the threshold volumetric flow rate corresponding to the deionized water wash solution.

Fluid contacting of the wash solution with the components and surfaces of the redox flow battery power module and to surfaces external to the power module may be maintained until an end wash condition is met at 844. As described above, the end wash condition may be met when one or more of a threshold volume of wash solution is circulated through the system, the wash solution is circulated for a threshold duration, a temperature of the redox flow battery system during washing decreases below a threshold temperature, and the wash solution is circulated for a threshold number of passes through the system, The end wash condition may further include one or more qualitative conditions including the absence of one or more of electrolyte foaming, electrolyte organic odors, cloudy electrolyte, and clogging of electrolyte. Further still each type of wash condition (e.g., threshold volume, threshold temperature, threshold number of passes, threshold duration, qualitative wash conditions and the like) may be different for each wash solution type and may vary when washing a new redox flow battery system (e.g., new system condition is met at 810) or when washing a used redox flow battery system (e.g., new system condition is not met at 810). If the end wash condition for the current wash solution is not met, method 800 continues at 844.

Next, for the case where the end wash condition is met, method 800 continues at 846 where controller 80 may drain the wash solution after the wash condition for the current wash solution is met. Draining the wash solution may include opening a drain valve 92 and draining the wash solution from the redox flow battery system 10 to a drain. Controller 80 may actuate one or more of pumps 30, 32 and 94 to aid in draining the wash solution.

After draining the wash solution, the controller 80 determines if another wash solution is to be circulated through the redox flow battery system. For the case where another wash solution is to be circulated through the redox flow battery system, method 800 returns to 842 where the next wash solution is circulated through the redox flow battery system until the corresponding end wash condition is met, after which the wash solution is then drained at 846. As described above the end wash conditions corresponding to each particular wash solution may be the same or different. In this manner, a series of one or more wash solutions may be circulated and fluidly contacted with the redox flow battery system to wash and remove contaminants accumulated therein, such as at the plating material of the plating electrode or at interior surfaces of the battery electrode compartments, electrolyte chambers, surfaces external to the power module, and the like.

In one embodiment, washing the redox flow battery system may include circulating two wash solutions through the redox flow battery system. First, a hydrogen peroxide solution may be circulated through the electrolyte-absent redox flow battery system. The hydrogen peroxide solution may include a 3 wt. % to 5 wt. % hydrogen peroxide solution, which can aid in oxidizing and removing contaminants such as plastics additives present in and/or leached from plastic components in contact with electrolyte fluid in the redox flow battery system. After circulating the hydrogen peroxide solution through the redox flow battery system and draining the hydrogen peroxide solution therefrom, a second wash solution consisting of deionized water may be circulated through the redox flow battery system to rinse away residual hydrogen peroxide solution and to prepare the redox flow battery system for cycling (e.g., charge and discharge). The threshold duration for circulating the hydrogen peroxide solution through the redox flow battery system may be longer and the threshold volume of hydrogen peroxide solution circulated through the redox flow battery system may be larger as compared to the respective threshold duration and threshold volume for circulating the deionized water to help ensure that the contact time between the hydrogen peroxide solution and the contaminated surfaces is long enough to oxidize, degrade, and wash away the plastic additive contaminants. In contrast, the threshold duration for circulating the deionized water through the redox flow battery system may be shorter longer and the threshold volume of deionized water circulated through the redox flow battery system may be smaller since the deionized water may serve principally to wash away residual hydrogen peroxide solution. Furthermore, the threshold duration for circulating a particular wash solution may be shorter and the threshold volume for circulating a particular wash solution may be lower in a used battery system because the contaminants have already substantially leached into the electrolyte. In contrast, the threshold duration for circulating a particular wash solution may be longer and the threshold volume for circulating a particular wash solution may be higher in a new battery system in order to substantially leach and oxidize the contaminants from the internal surfaces of the system components into the wash solution.

Returning to 850 for the case where another wash solution is not circulated, method 800 continues at 860 where the negative and positive electrolyte are supplied to the negative and positive electrode compartments 20 and 22 of the redox flow battery. For example, in the case where a redox flow battery system is new (e.g., new system condition is met at 810), the controller 80 may actuate an external pump to deliver electrolyte from an external source to the electrolyte chambers 50 and 52 and/or the electrode compartments 20 and 22. Alternately, dry negative electrolyte and dry positive electrolyte may be loaded to the negative and positive electrolyte chambers 50 and 52; deionized water may be delivered to the negative and positive electrolyte chambers 50 and 50, and the electrolyte chambers may be heated to a threshold temperature to solubilize and hydrate the dry electrolyte. In contrast, for the case where a redox flow battery system is not new (e.g., new system condition is not met at 810), controller 80 may actuate a pump such as wash solution pump 94 to return drained electrolyte from the holding tank 91 to the redox flow battery. Controller 80 may further actuate electrolyte pumps 30 and 32 to supply the returned electrolyte (e.g., negative and positive electrolyte) to the negative and positive electrode compartments 20 and 22 from the negative and positive electrolyte chambers 50 and 52. Next at 880, the controller 80 may actuate electrolyte pumps 30 and 32 and begin supplying power to the redox flow battery system to initiate (e.g., resume) charge-discharge cycling thereof.

Returning to 820, for the case where the start wash condition is not met, method 800 continues at 824, where the controller 80 continues cycling of the redox flow battery system. After 824, and after 880, method 800 ends.

An embodiment of a method for a redox flow battery includes interrupting cycling of the redox flow battery, including, charging the redox flow battery to a threshold charge condition, draining positive and negative electrolyte from the redox flow battery, circulating a wash solution through the redox flow battery, and returning the positive and negative electrolyte to the redox flow battery, and resuming cycling of the redox flow battery. A first example of the method includes wherein the threshold charge condition includes a battery state of charge at top-of-charge. A second example of the method, optionally including the first example, further includes circulating the wash solution through the redox flow battery includes circulating a hydrogen peroxide solution through the redox flow battery. A third example of the method, optionally including the first and/or second example, further includes wherein a concentration of the hydrogen peroxide solution is from 3 wt. % to 30 wt. %. A fourth example of the method, optionally including one or more of the first through third examples, further includes wherein circulating the wash solution through the redox flow battery includes circulating the wash solution through the redox flow battery only after charging the redox flow battery to the threshold charge condition. A fifth example of the method, optionally including one or more of the first through fourth examples, further includes wherein circulating the wash solution through the redox flow battery includes wherein circulating the wash solution through the redox flow battery only when electrolyte is absent from the redox flow battery and storage tank. A sixth example of the method, optionally including one or more of the first through fifth examples, further includes wherein circulating the wash solution through the redox flow battery includes circulating a threshold volume of the wash solution through the redox flow battery, wherein the redox flow battery is an all-iron redox flow battery. A seventh example of the method, optionally including one or more of the first through sixth examples, further includes wherein circulating the wash solution through the redox flow battery includes circulating the wash solution through the redox flow battery for a threshold duration. An eighth example of the method, optionally including one or more of the first through seventh examples, further includes wherein circulating the wash solution throughout the redox flow battery includes fluidly contacting the wash solution with each of a positive electrode, negative electrode, separator, positive compartment, and negative compartment of the redox flow battery.

Another embodiment of a method of operating a redox flow battery includes, during a first condition, including the redox flow battery comprising an electrolyte volume above a lower electrolyte threshold volume, charging the redox flow battery to a threshold charge condition, draining positive and negative electrolyte from the redox flow battery, circulating a wash solution through the redox flow battery, draining the wash solution from the redox flow battery, and returning the positive and negative electrolyte to the redox flow battery. A first example of the method includes, wherein the first condition further includes the redox flow battery having undergone at least one charge and discharge cycle. A second example of the method, optionally including the first example, further includes wherein during the first condition, the lower electrolyte threshold volume corresponds to the redox flow battery being empty of electrolyte. A third example of the method, optionally including the first and/or second examples, further includes wherein circulating the wash solution through the redox flow battery draining the wash solution from the redox flow battery are performed in response to a second condition being met, the second condition including when electrolyte is absent from the redox flow battery. A fourth example of the method, optionally including one or more of the first through third examples, further includes washing the redox flow battery with deionized water after draining the wash solution. A fifth example of the method, optionally including one or more of the first through fourth examples, further includes wherein the second condition further includes prior to the redox flow battery being charged.

Turning now to FIG. 9, it illustrates an example timeline 900 for operating a redox flow battery system 10 according to the method 800, including washing a redox flow battery system to remove electrolyte contaminants. Timeline 900 includes plot 910, indicating when a new system condition is met, plot 920 indicating when a start wash condition is met, and plot 922 indicating when an end wash condition is met. Timeline 900 further includes plot 930, indicating a redox flow battery SOC, as well as a threshold SOC, 936. Timeline 900 further includes plot 940, indicating a volume of electrolyte in the redox flow battery negative and positive electrode compartments 20 and 22 as well as a lower threshold compartment electrolyte volume 946 and an upper threshold compartment electrolyte volume 948. The volume of electrolyte in the redox flow battery compartments may be determined by tracking a volume of electrolyte delivered thereto by the pumps 30 and 32. Timeline 900 further includes plot 950, indicating a volume of electrolyte in the negative and positive electrolyte chambers 50 and 52, and a lower threshold chamber electrolyte volume indicated by 956. The volume of electrolyte in the electrolyte chambers may be determined by one or more level sensors 60 and 62 positioned thereat. Timeline 900 further includes plots 960 and 980, indicating the ON/OFF status of electrolyte pumps 30 and 32, and wash solution pump 94, respectively. A wash solution volume delivered to the redox flow battery is shown by plot 970, in which threshold wash solution volumes 976 and 978 are also indicated. The wash solution volume may be determined by tracking the volume of each type of wash solution delivered to the redox flow battery system by way of wash solution pump 94. Timeline 900 also shows plot 990, indicating the number of charge-discharge cycles performed by the redox flow battery system, and a lower threshold number of cycles indicated by dashed line 996.

The portion of timeline 900 from prior to time $t_1$ to time $t_7$ corresponds to operation of a new redox flow battery system, whereas the portion of timeline from prior to time $t_8$ to time $t_{14}$ corresponds to operation of a used (new system condition not met) redox flow battery system. The time axis may not be drawn precisely to scale, but rather serves to illustrate events occurring sequentially in time. Furthermore, for purposes of illustration, operation of the new and used redox flow battery systems are shown on the same timeline (separated by ellipses); however, the new and used redox flow battery systems corresponding to from time $t_1$ to time $t_7$, and from time $t_8$ to time $t_{14}$, respectively, may be different redox flow battery systems.

Prior to time $t_1$, the redox flow battery system is a new system, as indicated by the new system condition being met. The new system condition being met may include one or more of the compartment electrolyte volume being less than the lower threshold compartment electrolyte volume, the number of charge-discharge cycles being less than a lower threshold number of cycles, and a chamber electrolyte volume being less than the lower threshold chamber electrolyte volume. Because the redox flow battery system is empty of liquids, the compartment electrolyte volume and the battery wash solution volume are 0.

At time $t_1$, in response to the new system condition being met, controller 80 switches the wash solution pump ON, thereby delivering wash solution to the redox flow battery system. The battery wash solution volume increases after time $t_1$ as wash solution is delivered to the redox flow battery system. In the example of timeline 900, the wash solution pump may be switched ON to supply a threshold volume of wash solution 976 to circulate through the new redox flow battery system. At time $t_{1a}$ after supplying the threshold volume of wash solution 976, the controller 80 may switch OFF the wash solution pump, and switch ON the electrolyte pumps (pumps 30 and 32) to circulate the supplied wash solution through the redox flow battery system. In response to the new system condition being met, circulating the wash solution through the redox flow battery system may include fluidly contacting the wash solution with the interior surfaces of the power module (e.g., negative and positive electrode compartments, electrode bipolar plate, mesh spacer, and flow fields, and the like), as well as surfaces of auxiliary equipment external to the power module including the negative and positive electrolyte chambers, piping, pumps, valves, rebalancing systems, and the like. As described above, the first wash solution circulated through the redox flow battery system may include hydrogen peroxide solution for oxidizing and removing contaminants such as plastic additives from the interior surfaces of the redox flow battery system components that can leach from the plastic components into the electrolyte during operation of the redox flow battery system. The hydrogen peroxide solution may be circulated through the redox flow battery system until an end wash condition corresponding to the first wash solution is met. The end wash condition may include one or more conditions, as described above. In the example of timeline 900, the end wash condition includes when the threshold volume of wash solution is delivered to the system and circulated for a threshold first duration, for example the duration from time $t_{1a}$ to time $t_2$. Fluidly contacting the interior surfaces of the new redox flow battery system with the hydrogen peroxide wash solution until the end wash condition is met, such as for the threshold first duration, may aid in removing leachable additives from the plastic components so that a risk of contaminants leaching into the electrolyte during redox flow battery operation is reduced.

After the first threshold duration has elapsed at time $t_2$, in response to the end wash condition 922 being met, the first wash solution (e.g., the hydrogen peroxide solution) is drained. In one example, draining the wash solution may include the controller 80 opening a drain valve 92 while operating pumps 30 and 32 to drain the wash solution from the redox flow battery to a drain. Upon completion of draining the wash solution at time $t_3$, the end wash condition 922 is reset to not being met, the electrolyte pumps are switched OFF, and the wash solution pump is switched ON so that a second wash solution may be supplied to the redox flow battery system. As previously described the second wash solution may include deionized water to rinse and wash out any residual hydrogen peroxide solution from the system. As the second wash solution is delivered to the system, the battery wash solution volume increases. After supplying the threshold volume of wash solution 976 at time $t_{3a}$, the controller 80 may switch OFF the wash solution pump, and switch ON the electrolyte pumps (pumps 30 and 32) to circulate the supplied wash solution through the redox flow battery system. In response to the new system condition being met, circulating the wash solution through the redox flow battery system may include fluidly contacting the wash solution with the interior surfaces of the power module (e.g., negative and positive electrode compartments, electrode bipolar plate, mesh spacer, and flow fields, and the like), as well as surfaces of auxiliary equipment external to the power module including the negative and positive electrolyte chambers, rebalancing reactors, valves, piping, pumps, and the like.

The second wash solution is delivered to the system and recirculated until the end wash condition corresponding to the second wash solution is met. The end wash condition may include one or more conditions, as described above. In the example of timeline 900, the end wash condition corresponding to the second wash solution includes when a threshold volume of deionized water wash solution is delivered, and after the threshold volume of deionized water wash solution is circulated for a threshold duration, for example the duration from time $t_{3a}$ to time $t_4$. As previously described, the threshold duration for circulating each wash solution type through the redox flow battery may be different; for example, the threshold duration corresponding to circulating the deionized water may be shorter than the threshold duration corresponding to circulating the hydrogen peroxide solution because the deionized water wash is for rinsing residual hydrogen peroxide solution, while the hydrogen peroxide wash is for oxidizing and chemically degrading plastic additives at the internal surfaces of the redox flow battery system. Accordingly the threshold duration for circulating the hydrogen peroxide solution may be longer to allow enough fluid contact time for thorough oxidation and washing of the plastic contaminants within the internal surfaces of the redox flow battery system components.

When the threshold duration for the second wash solution (deionized water) has elapsed at time $t_4$, in response to the end wash condition 922 being met the second wash solution is drained by the controller 80 by opening a drain valve 92 while operating pumps 30 and 32 to drain the wash solution from the redox flow battery. Upon completion of draining the second wash solution at time $t_5$, the end wash condition 922 is reset to not being met, washing of the new redox flow battery system ends and the controller 80 supplies electrolyte to the electrode compartments 20 and 22 of the redox flow battery system. As described above, in the case where a redox flow battery system is new (e.g., new system condition is met), the controller 80 may actuate an external pump to deliver electrolyte from an external source to the electrolyte chambers 50 and 52 and/or the electrode compartments 20 and 22. Alternately, dry negative electrolyte and dry positive electrolyte may be loaded to the negative and positive electrolyte chambers with deionized water, and the electrolyte chambers may be heated to a threshold temperature to solubilize and hydrate the dry electrolyte. As the electrolyte is supplied to the redox flow battery system, the compartment electrolyte volume and the chamber electrolyte volume increase; however, as the compartment electrolyte volume approaches the upper threshold compartment electrolyte volume, the chamber electrolyte volume may decrease. Upon supplying enough electrolyte to cycle the redox flow battery system, as may be indicated by the compartment electrolyte volume increasing above the upper threshold compartment electrolyte volume 948 at time $t_6$, the controller 80 may begin supplying power to the redox flow battery system to initiate charge-discharge cycling thereof. After time $t_5$, when the compartment electrolyte volume increases above the lower threshold compartment electrolyte volume 946 and when the chamber electrolyte volume increases above the lower threshold chamber electrolyte volume 956, and/or after time $t_7$ when the number of charge-discharge cycles increases above the lower threshold number of cycles 996, the new system condition is no longer met. After time $t_7$, charge-discharge cycling of the redox flow battery system continues.

Prior to time $t_8$, the redox flow battery system is a used system, as indicated by the new system condition not being met. The new system condition being not met may include one or more of the compartment electrolyte volume being greater than the lower threshold compartment electrolyte volume, the number of charge-discharge cycles being greater than a lower threshold number of cycles, and a chamber electrolyte volume being greater than the lower threshold chamber electrolyte volume. Because the redox flow battery system is cycling between charge and discharge, the compartment electrolyte volume is at an upper threshold compartment electrolyte volume 948. Just prior to time $t_8$, the redox flow battery system SOC at the top-of-charge decreases below the threshold SOC 936, which triggers satisfying the start wash condition 920. Additionally or alternately, the start wash condition may be met when a redox flow compartment electrolyte volume is above a lower threshold compartment electrolyte volume and/or a number of charge-discharge cycles is greater than a lower threshold number of cycles, indicating that the redox flow battery system is used and has accumulated electrolyte contaminants.

At time $t_8$, in response to the start wash condition being met, controller 80 interrupts cycling of the redox flow battery system and charges the redox flow battery to the top-of-charge in order to accumulate electrolyte contaminants at the power module electrodes. After charging the redox flow battery system to the top-of-charge, the controller 80 drains electrolyte from the redox flow battery system. The drained electrolyte may be stored in a holding tank 91; holding tank 91 may include a plurality of holding tanks where the drained negative and positive electrolytes may be stored separately. While draining the electrolyte, the compartment electrolyte volume and the chamber electrolyte volume continually decrease and the electrolyte pumps remain switched ON to aid in draining the electrolyte.

At time $t_9$, the controller 80 switches the wash solution pump ON, thereby delivering wash solution to the redox flow battery system. The battery wash solution volume increases after time $t_9$ as wash solution is delivered to the redox flow battery system. In the example of timeline 900, the wash solution pump may be switched ON to supply a threshold volume of wash solution 978 to circulate through the used redox flow battery system. At time $t_{9a}$ after supplying the threshold volume of wash solution 978, the controller 80 may switch OFF the wash solution pump, and switch ON the electrolyte pumps (pumps 30 and 32) to circulate the supplied wash solution through the redox flow battery system. Circulating the wash solution through the redox flow battery system may include fluidly contacting the wash solution with the interior surfaces of the power module (e.g., negative and positive electrode compartments, electrode bipolar plate, mesh spacer, and flow fields, and the like), as well as surfaces of auxiliary equipment external to the power module including the negative and positive electrolyte chambers, piping, pumps, rebalancing systems, valves, and the like. As described above, the first wash solution circulated through the redox flow battery system may include hydrogen peroxide solution for oxidizing and removing contaminants such as plastic additives from the interior surfaces of the redox flow battery system components that can leach from the plastic components into the electrolyte during operation of the redox flow battery system.

The first wash solution is delivered to the system and recirculated until the end wash condition corresponding to the first wash solution is met. The end wash condition may include one or more conditions, as described above. In the example of timeline 900, the end wash condition corresponding to the first wash solution includes when a threshold volume of hydrogen peroxide wash solution is delivered, and after the threshold volume of hydrogen peroxide wash solution is circulated for a threshold duration, for example the duration from time $t_{9a}$ to time $t_{10}$. Fluidly contacting the interior surfaces of the new redox flow battery system with the hydrogen peroxide wash solution for the threshold duration may aid in removing leachable additives from the plastic components so that a risk of contaminants leaching into the electrolyte during redox flow battery operation is reduced.

After the threshold duration has elapsed at time $t_{10}$, in response to the end wash condition being met, the first wash solution (e.g., the hydrogen peroxide solution) is drained. In one example, draining the wash solution may include the controller 80 opening a drain valve 92 while operating pumps 30 and 32 to drain the wash solution from the redox flow battery system to a drain. Upon completion of draining the wash solution at time $t_{11}$, the end was condition is reset to not being met, the electrolyte pumps are switched OFF, and the wash solution pump is switched ON so that a second wash solution may be supplied to the redox flow battery system. As previously described the second wash solution may include deionized water to rinse and wash out any residual hydrogen peroxide solution from the system. As the second wash solution is delivered to the system, the battery wash solution volume increases. After supplying the threshold volume of wash solution 978 at time $t_{11a}$, the controller 80 may switch OFF the wash solution pump, and switch ON the electrolyte pumps (pumps 30 and 32) to circulate the supplied wash solution through the redox flow battery system. Circulating the wash solution through the redox flow battery system may include fluidly contacting the wash solution with the interior surfaces of the power module (e.g., negative and positive electrode compartments, electrode bipolar plate, mesh spacer, and flow fields, and the like), as well as surfaces of auxiliary equipment external to the power module including the negative and positive electrolyte chambers, rebalancing systems, valves, piping, pumps, and the like.

The second wash solution is delivered to the system and recirculated until the end wash condition corresponding to the second wash solution is met. The end wash condition may include one or more conditions, as described above. In the example of timeline 900, the end wash condition corresponding to the second wash solution includes when a threshold volume of deionized water wash solution is delivered, and after the threshold volume of deionized water wash solution is circulated for a threshold duration, for example the duration from time $t_{11a}$ to time $t_{12}$. As previously described, the threshold duration for circulating each wash solution type through the redox flow battery may be different; for example, the threshold duration corresponding to circulating the deionized water may be shorter than the threshold duration corresponding to circulating the hydrogen peroxide solution because the deionized water wash is for rinsing residual hydrogen peroxide solution, while the hydrogen peroxide wash is for oxidizing and chemically degrading plastic additives at the internal surfaces of the redox flow battery system. Accordingly the threshold duration for circulating the hydrogen peroxide solution may be longer to allow enough fluid contact time for thorough oxidation and washing of the plastic contaminants within the internal surfaces of the redox flow battery system components.

When the threshold duration for the second wash solution (deionized water) has elapsed at time $t_{12}$, in response to the end wash condition being met, the second wash solution is drained by the controller 80 by opening a drain valve 92 while operating pumps 30 and 32 to drain the wash solution from the redox flow battery. Upon completion of draining the second wash solution at time $t_{13}$, the end wash condition is reset to not being met, washing of the new redox flow battery system ends and the controller 80 supplies electrolyte to the electrode compartments 20 and 22 of the redox flow battery system. In one example, the controller 80 may reuse the negative and positive electrolyte drained to the holding tank 91. As the electrolyte is supplied to the redox flow battery system, the compartment electrolyte volume and the chamber electrolyte volume increase. Upon supplying enough electrolyte to cycle the redox flow battery system, as may be indicated by the compartment electrolyte volume increasing above the upper threshold compartment electrolyte volume 948 at time $t_{14}$, the controller 80 may begin supplying power to the redox flow battery system to initiate charge-discharge cycling thereof. After time $t_{14}$, charge-discharge cycling of the redox flow battery system continues.

As such, an embodiment of a redox flow battery system includes a redox flow battery, an electrolyte storage tank fluidly connected to the redox flow battery, an electrolyte pump fluidly connected between the electrolyte storage tank and the redox flow battery, and a controller, including executable instructions stored in non-transitory memory thereon to, interrupt cycling of the redox flow battery, including, charging the redox flow battery to a threshold charge condition, draining positive and negative electrolyte from the redox flow battery, circulating a wash solution through the redox flow battery, and circulating deionized water through the redox flow battery, returning the positive and negative electrolyte to the redox flow battery, and resume cycling of the redox flow battery. A first example of the redox flow battery system includes wherein the executable instructions to drain the positive and negative electrolyte include draining the positive and negative electrolyte from the redox flow battery and pumping the positive and negative electrolyte from the redox flow battery to a holding tank. A second example of the redox flow battery system, optionally including the first example, further includes wherein the executable instructions to circulate the wash solution through the redox flow battery include the electrolyte pump circulating the wash solution through the redox flow battery. A third example of the redox flow battery system, optionally including the first and/or second examples, further includes wherein the executable instructions to drain the wash solution from the redox flow battery include pumping the wash solution out of the redox flow battery with the electrolyte pump prior to circulating deionized water through the redox flow battery. A fourth example of the redox flow battery system, optionally including one or more of the first through third examples, further includes wherein the executable instructions to return the positive and negative electrolyte to the redox flow battery include pumping the positive and negative electrolyte to the redox flow battery with the electrolyte pump after pumping the wash solution and pumping the deionized water out of the redox flow battery with the electrolyte pump.

In this way, contamination of the redox flow battery system may be reduced, thereby prolonging the life and increasing performance of the redox flow battery system. In particular, many more organic contaminants may be more easily degraded and removed by circulating the wash solution through the redox flow battery system, a smaller volume of wash solution may be used to carry out the washing, and washing of the washed redox flow battery system including disposal of the wash solution may be simplified, relative to conventional methods.

It will also be appreciated that the configurations and routines disclosed herein are exemplary in nature, and that these specific embodiments are not to be considered in a limiting sense, because numerous variations are possible. For example, the above technology may be applied to other flow battery types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

This concludes the description. The reading of it by those skilled in the art would bring to mind many alterations and modifications without departing from the spirit and the scope of the description. For example, hybrid redox flow battery systems, all-iron hybrid redox flow battery systems, and other redox flow battery systems may all take advantage of the present description.

The invention claimed is:

1. A method for a redox flow battery, comprising:
   interrupting cycling of the redox flow battery, including,
   charging the redox flow battery to a threshold charge condition,
   draining positive and negative electrolyte from the redox flow battery,
   circulating a wash solution through the redox flow battery, and
   returning the positive and negative electrolyte to the redox flow battery, and
   resuming cycling of the redox flow battery.

2. The method of claim 1, wherein the threshold charge condition includes a battery state of charge at top-of-charge.

3. The method of claim 1, wherein circulating the wash solution through the redox flow battery includes circulating a hydrogen peroxide solution through the redox flow battery.

4. The method of claim 3, wherein a concentration of the hydrogen peroxide solution is from 3 wt. % to 30 wt. %.

5. The method of claim 1, wherein circulating the wash solution through the redox flow battery includes circulating the wash solution through the redox flow battery only after charging the redox flow battery to the threshold charge condition.

6. The method of claim 1, wherein circulating the wash solution through the redox flow battery includes wherein circulating the wash solution through the redox flow battery only when electrolyte is absent from the redox flow battery and storage tank.

7. The method of claim 1, wherein circulating the wash solution through the redox flow battery includes circulating a threshold volume of the wash solution through the redox flow battery, wherein the redox flow battery is an all-iron redox flow battery.

8. The method of claim 1, wherein circulating the wash solution through the redox flow battery includes circulating the wash solution through the redox flow battery for a threshold duration.

9. The method of claim 1, wherein circulating the wash solution throughout the redox flow battery includes fluidly contacting the wash solution with each of a positive electrode, negative electrode, separator, positive compartment, and negative compartment of the redox flow battery.

10. A method of operating a redox flow battery, comprising:
    during a first condition, including the redox flow battery comprising an electrolyte volume above a lower electrolyte threshold volume,
    charging the redox flow battery to a threshold charge condition,
    draining positive and negative electrolyte from the redox flow battery,
    circulating a wash solution through the redox flow battery,
    draining the wash solution from the redox flow battery, and
    returning the positive and negative electrolyte to the redox flow battery.

11. The method of claim 10, wherein the first condition further includes the redox flow battery having undergone at least one charge and discharge cycle.

12. The method of claim 10, wherein during the first condition, the lower electrolyte threshold volume corresponds to the redox flow battery being empty of electrolyte.

13. The method of claim 10, wherein circulating the wash solution through the redox flow battery draining the wash solution from the redox flow battery are performed in response to a second condition being met, the second condition including when electrolyte is absent from the redox flow battery.

14. The method of claim 13, further comprising, washing the redox flow battery with deionized water after draining the wash solution.

15. The method of claim 13, wherein the second condition further includes prior to the redox flow battery being charged.

16. A redox flow battery system, comprising:
a redox flow battery,
an electrolyte storage tank fluidly connected to the redox flow battery,
an electrolyte pump fluidly connected between the electrolyte storage tank and the redox flow battery, and
a controller, including executable instructions stored in non-transitory memory thereon to,
interrupt cycling of the redox flow battery, including,
charging the redox flow battery to a threshold charge condition,
draining positive and negative electrolyte from the redox flow battery,
circulating a wash solution through the redox flow battery, and
circulating deionized water through the redox flow battery,
returning the positive and negative electrolyte to the redox flow battery, and
resume cycling of the redox flow battery.

17. The redox flow battery system of claim 16, wherein the executable instructions to drain the positive and negative electrolyte include draining the positive and negative electrolyte from the redox flow battery and pumping the positive and negative electrolyte from the redox flow battery to a holding tank.

18. The redox flow battery of claim 16, wherein the executable instructions to circulate the wash solution through the redox flow battery include the electrolyte pump circulating the wash solution through the redox flow battery.

19. The redox flow battery system of claim 16, wherein the executable instructions to drain the wash solution from the redox flow battery include pumping the wash solution out of the redox flow battery with the electrolyte pump prior to circulating the deionized water through the redox flow battery.

20. The redox flow battery system of claim 16, wherein the executable instructions to return the positive and negative electrolyte to the redox flow battery include pumping the positive and negative electrolyte to the redox flow battery with the electrolyte pump after pumping the wash solution and pumping the deionized water out of the redox flow battery with the electrolyte pump.

* * * * *